United States Patent
Qasem

(10) Patent No.: US 11,761,644 B1
(45) Date of Patent: Sep. 19, 2023

(54) COOLING AND DESALINATION SYSTEM

(71) Applicant: KING FAHD UNIVERSITY OF PETROLEUM AND MINERALS, Dhahran (SA)

(72) Inventor: Naef A. A. Qasem, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 17/728,490

(22) Filed: Apr. 25, 2022

(51) Int. Cl.
  *F24F 3/14* (2006.01)
  *B01D 53/26* (2006.01)
  *F25B 15/06* (2006.01)

(52) U.S. Cl.
  CPC .......... *F24F 3/1411* (2013.01); *B01D 53/265* (2013.01); *F25B 15/06* (2013.01)

(58) Field of Classification Search
  CPC ... F24F 3/1411; B01D 5/0039; B01D 5/0078; B01D 53/265; F25B 15/06; F25B 15/006; F25B 15/008; F25B 15/16
  See application file for complete search history.

(56) References Cited

U.S. PATENT DOCUMENTS

| | | | |
|---|---|---|---|
| 8,820,723 B1 | 9/2014 | Sparrow et al. | |
| 10,829,913 B1 | 11/2020 | Ahmed et al. | |
| 11,035,581 B1 | 6/2021 | Abdulrahim et al. | |
| 2019/0351347 A1* | 11/2019 | Antar | F24F 3/1405 |
| 2022/0135439 A1* | 5/2022 | Alkhulaifi | B01D 5/0078 203/10 |

FOREIGN PATENT DOCUMENTS

| CN | 102315797 A | 1/2012 |
|---|---|---|
| IN | 201505029 I4 | 7/2017 |

OTHER PUBLICATIONS

C. Chiranjeevi, et al., "Influence of vapor absorption cooling on humidification-dehumidification (HDH) desalination", Alexandria Engineering Journal, vol. 55, Issue 3, 2016, pp. 1961-1967.

* cited by examiner

*Primary Examiner* — Joseph F Trpisovsky
(74) *Attorney, Agent, or Firm* — Oblon, McClelland, Maier & Neustadt, L.L.P.

(57) ABSTRACT

A cooling and desalination system, and a method for concurrent cooling and desalination are provided. The cooling and desalination system includes a humidification-dehumidification (HDH) system including a humidifier for humidifying a carrier gas using saline water, and a dehumidifier for dehumidifying the carrier gas to obtain desalinated water. The cooling and desalination system further includes a vapor-absorption refrigeration (VAR) system including an evaporator for evaporating a refrigerant and providing cooling effect, an absorber for absorbing the refrigerant by an absorbent, a desorber for heating the refrigerant and the absorbent to obtain vapors of the refrigerant, and a condenser for condensing the vapors of the refrigerant. Herein, the HDH system and the VAR system are connected at the absorber and the condenser so that the carrier gas, after passing through the humidifier, is configured to absorb heat from the absorber and the condenser, before entering the dehumidifier.

20 Claims, 15 Drawing Sheets

COOLING AND DESALINATION SYSTEM

STATEMENT REGARDING PRIOR DISCLOSURE BY THE INVENTORS

Aspects of the present disclosure appear in "Waste-heat recovery from a vapor-absorption refrigeration system for a desalination plant" (Applied Thermal Engineering, 2021, 195, 117199), which is incorporated herein by reference in its entirety.

BACKGROUND

Technical Field

The present disclosure is directed to an integrated cooling and desalination system, and more particularly to waste-heat recovery from a vapor-absorption refrigeration (VAR) system to efficiently power a humidification-dehumidification (HDH) system of a desalination plant for freshwater production.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Fresh water and comfortable indoor conditions are two of the major global requirements, and particularly in hot and arid regions. Desalination methods are practical solutions used to fulfill the potable water requirement. Reverse osmosis, electrodialysis, and multi-effect desalination are examples of commercial desalination technologies that have been utilized to produce fresh water. Nevertheless, humidification-dehumidification (HDH) desalination systems may practically be used on a small scale for decentralized water production. It is noted that such HDH desalination systems use thermal energy to drive the humidification-dehumidification.

Concerning cooling requirements, different refrigeration systems have been proposed in the literature including vapor-compression refrigeration (VAR) systems, vapor-absorption refrigeration (VAR) systems, and vapor-adsorption (VAD) systems. Each of these refrigeration systems has their advantages and disadvantages depending on their operations. For instance, VAR systems have a higher coefficient of performance (COP), while the VAR systems may be driven by thermal energy sources and use environmentally friendly refrigerants (e.g., lithium bromide). It may be noted that each of the said types of refrigeration systems generates thermal energy, which is usually expelled into the atmosphere as waste heat.

Since the refrigeration systems expel waste heat, this thermal energy may be used to drive HDH systems efficiently. Thus, the coupling of HDH systems with refrigeration systems has attracted a lot of attention recently. Different refrigeration systems were investigated in the literature to power HDH systems, including the VAR systems [See: D. Lawal, M. Antar, A. Khalifa, S. Zubair, F. Al-Sulaiman, Humidification-dehumidification desalination system operated by a heat pump, Energy Convers Manag 161 (2018) 128-140], the VAR systems [See: H. Rostamzadeh, A. S. Namin, H. Ghaebi, M. Amidpour, Performance assessment and optimization of a humidification dehumidification (HDH) system driven by absorption-compression heat pump cycle, Desalination 447 (2018) 84-101], and the VAD systems [See: N. A. A. Qasem, S. M. Zubair, Performance evaluation of a novel hybrid humidification-dehumidification (air-heated) system with an adsorption desalination system, Desalination 461 (2019) 37-54].

Further, U.S. patent Ser. No. 11/035,581B1 discloses an integrated desalination and air conditioning system, where dry air is heated by a condenser before entering a humidification column, and the heated humid air is then cooled by an evaporator. CN Patent Publication Number 102315797A discloses a hybrid system, comprising a photovoltaic system, a cooling system for cooling the photovoltaic system, and a first device configured to receive a cooling fluid from the cooling system. While the first device may include a water desalination unit, a temperature booster is disposed between the first device and the cooling system, and configured to heat the cooling fluid fed from the first device to the photovoltaic system. Chiranjeevi et al. [See: Influence of vapor absorption cooling on humidification-dehumidification (HDH) desalination, Alexandria Engineering Journal (2016) 55, 1961-1967] studies a VAR system and an HDH system coupled together, with the two systems being coupled at the respective evaporator and dehumidifier.

Each of the aforementioned references suffers from one or more drawbacks hindering their adoption. None of the references teaches about utilizing the expelled heat from condensers, absorbers, or both, from the VAR system in order to drive HDH systems efficiently.

Accordingly, it is one object of the present disclosure to provide a cooling and desalination system, and a method for concurrent cooling and desalination, which provide coupling of the HDH system with the refrigeration system such that the waste heat from the refrigeration system could be used to drive HDH system efficiently.

SUMMARY

In an exemplary embodiment, a cooling and desalination system is provided. The cooling and desalination system comprises a humidification-dehumidification (HDH) system comprising a humidifier for humidifying a carrier gas using saline water, and a dehumidifier for dehumidifying the carrier gas to obtain desalinated water. The cooling and desalination system further comprises a vapor-absorption refrigeration (VAR) system comprising an evaporator for evaporating a refrigerant and providing cooling effect, an absorber for absorbing the refrigerant by an absorbent, a desorber for heating the refrigerant and the absorbent to obtain vapors of the refrigerant, and a condenser for condensing the vapors of the refrigerant. Herein, the HDH system and the VAR system are connected at the absorber and the condenser so that the carrier gas, after passing through the humidifier, is configured to absorb heat from the absorber and the condenser, before entering the dehumidifier.

In one or more exemplary embodiments, a first outlet of the humidifier is connected to an inlet of the absorber, a second outlet of the humidifier is connected to an inlet of the condenser, an outlet of the absorber is connected to a first inlet of the dehumidifier, and an outlet of the condenser is connected to a second inlet of the dehumidifier.

In one or more exemplary embodiments, the cooling and desalination system further comprises a controller configured to adjust volumes of a first portion of the carrier gas exiting from the first outlet of the humidifier and a second portion of the carrier gas exiting from the second outlet of the humidifier.

In one or more exemplary embodiments, the absorber comprises a first heat exchanger for the first portion of the carrier gas to absorb latent heat of the absorbing the refrigerant by the absorbent, and the condenser comprises a second heat exchanger for the second portion of the carrier gas to absorb latent heat of the condensing the vapors of the refrigerant.

In one or more exemplary embodiments, the cooling and desalination system further comprises an unmixed heat exchanger for a weak solution exiting from the desorber to exchange heat with a strong solution exiting from the absorber.

In one or more exemplary embodiments, the cooling and desalination system includes at least a first desorber and a second desorber and a controller, the first desorber is configured to receive heat for heating the refrigerant and the absorbent to obtain the vapors of the refrigerant, and the controller is configured to adjust volumes of a first portion of the weak solution entering the first desorber and a second portion of the weak solution entering the second desorber.

In one or more exemplary embodiments, the cooling and desalination system includes at least a first unmixed heat exchanger and a second unmixed heat exchanger, the first unmixed heat exchanger is configured for the first portion of the strong solution to exchange heat with the weak solution existing from the first desorber, and the second unmixed heat exchanger is configured for the strong solution exiting from the absorber to exchange heat with a mixed solution existing from the second desorber.

In one or more exemplary embodiments, the second desorber is configured for mixing the second portion of the strong solution and the weak solution exiting from the first unmixed heat exchanger to obtain the mixed solution, and the second desorber comprises a heat exchanger configured for the vapors of the refrigerant exiting from the first desorber to exchange heat with the mixed solution.

In one or more exemplary embodiments, the cooling and desalination system further comprises a throttling valve configured to expand the refrigerant exiting from the condenser.

In one or more exemplary embodiments, the carrier gas comprises air

In another exemplary embodiment, a method for concurrent cooling and desalination is provided. The method comprises evaporating a refrigerant in an evaporator of a vapor-absorption refrigeration (VAR) system. The method further comprises absorbing the refrigerant by an absorbent in an absorber of the VAR system. The method further comprises heating the refrigerant and the absorbent to obtain first vapors of the refrigerant in a desorber of the VAR system. The method further comprises condensing the first vapors of the refrigerant in a condenser of the VAR system. The method further comprises humidifying a carrier gas in a humidifier of a humidification-dehumidification (HDH) system using saline water. The method further comprises dehumidifying the carrier gas to obtain desalinated water in a dehumidifier of the HDH system. Herein, the VAR system and the HDH system are configured so that the carrier gas, after the humidifying, absorbs heat from the absorber and the condenser, before the dehumidifying.

In one or more exemplary embodiments, the method also comprises splitting the carrier gas, after the humidifying, into a first portion and a second portion. The method further comprises passing the first portion of the carrier gas through the absorber. The method further comprises passing the second portion of the carrier gas through the condenser.

In one or more exemplary embodiments, the first portion of the carrier gas is configured to absorb latent heat of the absorbing the refrigerant by the absorbent, and the second portion of the carrier gas is configured to absorb latent heat of the condensing the vapors of the refrigerant.

In one or more exemplary embodiments, the first portion of the carrier gas is about 50-70 vol. % of the carrier gas.

In one or more exemplary embodiments, the method also comprises combining the first portion of the carrier gas and the second portion of the carrier gas before the dehumidifying.

In one or more exemplary embodiments, the method also comprises splitting a strong solution into a first portion and a second portion, the strong solution comprising the refrigerant and the absorbent exiting from the absorber. The method further comprises passing a first portion of the strong solution through a first unmixed heat exchanger. The method further comprises heating the first portion of the strong solution in a first desorber to obtain the first vapors of the refrigerant and a weak solution. The method further comprises passing the weak solution through the first unmixed heat exchanger.

In one or more exemplary embodiments, the method also comprises mixing the weak solution and a second portion of the strong solution to obtain a mixed solution in a second desorber. The method further comprises passing the first vapors of the refrigerant through the second desorber for heat exchange between the mixed solution and the first vapors of the refrigerant to obtain second vapors of the refrigerant from the mixed solution. The method further comprises condensing the first vapors of the refrigerant and the second vapors of the refrigerant in the condenser.

In one or more exemplary embodiments, the method also comprises passing the strong solution through a second unmixed heat exchanger before the splitting the strong solution. The method further comprises passing the mixed solution through the second unmixed heat exchanger. The method further comprises passing the mixed solution through the absorber such that the refrigerant, which exits from the evaporator, is absorbed by the weak solution.

In one or more exemplary embodiments, the carrier gas comprises air.

In one or more exemplary embodiments, the refrigerant comprises water, and the absorbent comprises lithium bromide.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
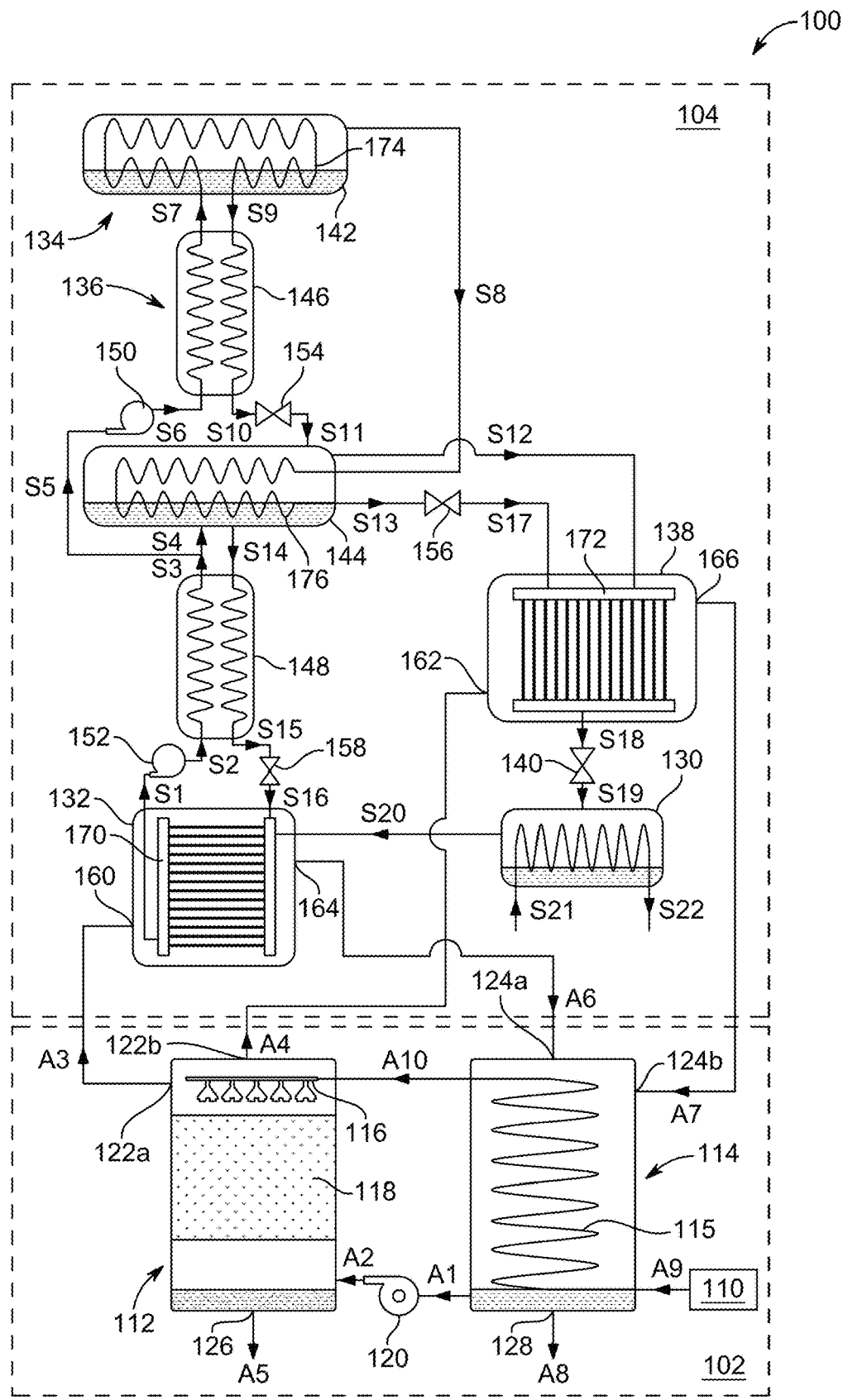
FIG. 1 is a schematic diagram of a cooling and desalination system, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a cooling and desalination system, and a method for concurrent cooling and desalination, for utilizing waste-heat of a vapor-absorption refrigeration (VAR) system to efficiently power a humidification-dehumidification (HDH) system for freshwater production. Limited research about this kind of hybrid systems is available. VAR systems have been exploited more than others to power HDH systems by heating saline water or circulated air, due to the fact that VAR systems have a higher coefficient of performance (COP). However, despite the fact that the VAR systems have a higher COP, the VAR systems have an advantage that they may be driven by thermal energy sources and use environmentally-friendly refrigerants (e.g., lithium bromide), and they discard heat from two components (e.g. a condenser and an absorber). Since the VAR systems expel heat from their condensers, absorbers, or generally both, this waste heat may be used to drive HDH systems efficiently. These features of the VAR systems make them best-suited to drive HDH systems.

Conventional systems rely on water-heated HDH cycles, in which the waste heat of VAR systems heats the HDH saline water before entering the humidifier. The present disclosure describes coupling an air-heated HDH system with a double-effect (DE) VAR system by circulating the HDH air to cool the absorber and condenser of the integrated DE-VAR system and concurrently drive the HDH system. In addition to having fewer corrosive issues compared to water-heated HDH systems, the proposed DE-VAR and air-heated HDH based system may produce a larger amount of fresh water and achieve better performance.

Referring to FIG. 1, illustrated is a schematic diagram of a cooling and desalination system, represented by reference numeral 100 and hereinafter referred to as "system 100" for brevity. The system 100 includes a humidification-dehumidification (HDH) system 102 and a vapor-absorption refrigeration (VAR) system 104. In the system 100, as illustrated, the HDH system 102 acts as a bottoming cycle and the VAR system 104 acts as a topping cycle, such that waste heat of the VAR system 104 is utilized to efficiently power the HDH system 102. The HDH system 102 is implemented by a carrier-gas-based thermal technique that can be utilized for water desalination applications. For this purpose, the HDH system 102 uses a carrier gas for circulation therein. The term "carrier gas" as used herein is a broad term, and refers without limitation to a gas that is used to carry another gas. In aspects of the present disclosure, the carrier gas comprises air. That is, the HDH system 102 is an air-heated HDH system, with the two terms being interchangeably used without any limitations. Further, the VAR system 104 uses a refrigerant for circulation therein. In aspects of the present disclosure, the VAR system 104 is a double-effect VAR (DE-VAR) system, as described later in the description in more detail and with the two terms being interchangeably used without any limitations. In general, in the present DE-VAR system 104, a refrigerant and an absorbent (as discussed later) are regenerated in two steps, for example using a medium grade of heat source (e.g. 100-400° C.), unlike a single stage VAR in which the regeneration takes place in a single step using lower grade of heat source (e.g. <100° C.).

In particular, as illustrated, the HDH system 102 includes a saline water source (as represented by reference numeral 110). As may be appreciated, such a saline water source 110 may be in the form of a storage tank for the saline water, or a pumping and piping arrangement for directly pumping sea water to be used as the saline water. The HDH system 102 further includes a humidifier 112 and a dehumidifier 114. As shown, the saline water source 110 is connected to a piping network 115, which passes through the dehumidifier 114, with a substantial portion thereof disposed inside the dehumidifier 114, and to end at an inner volume of the humidifier 112. The humidifier 112 includes a sprayer 116 disposed in connection with the piping network 115 to receive the saline water therefrom. The sprayer 116 is configured to spray the received saline water inside the inner volume of the humidifier 112. The humidifier 112 also includes a packed material (represented by reference numeral 118) arranged therein. As shown, the packed material 118 may cover a substantial portion of the inner volume of the humidifier 112. The packed material 118 may be used to increase mass and heat exchange between air and water streams (as discussed later in more detail), since the packed material 118 has a compact volume and a large surface area. In the present examples, the packed material 118 may be in the form of cellulose, e.g., paper, zigzag aluminum sheets, gunny bag and sawdust, jute cloth, cross-fluted film fill, plastic screens, ceramic corrugated, plastic, honeycomb paper, wooden slates, etc. The HDH system 102 further includes an air blower 120 to generate and air flow and/or air bubbles and a water pump (not shown) to transfer saline water from the dehumidifier 114 to the humidifier 112.

In the HDH system 102, the humidifier 112 is configured for humidifying the carrier gas using the saline water. Further, as shown, the dehumidifier 114 is configured for dehumidifying the carrier gas to obtain desalinated water. For this purpose, the HDH system 102 utilizes the waste heat of the VAR system 104, to heat the humidified carrier gas from the humidifier 112 before being passed to the dehumidifier 114 for condensation therein. The process details will be described later in more detail. As shown, the humidifier 112 has a first outlet 122a and a second outlet 122b, to supply the humidified carrier gas from the humidifier 112 to the VAR system 104. Also, as shown, the dehumidifier 114 has a first inlet 124a and a second inlet 124b, to receive the heated carrier gas from the VAR system 104. Further, as shown, the humidifier 112 has a brine outlet 126 to discharge collected brine therefrom; and the dehumidifier 114 has a desalinated water outlet 128 to discharge collected desalinated water therefrom.

Further, as illustrated in FIG. 1, the VAR system 104 includes an evaporator 130. The evaporator 130 is configured for evaporating the refrigerant and providing cooling effect. In the present examples, the refrigerant may be water without any limitations. The VAR system 104 also includes an absorber 132 provided with an absorbent, and disposed in connection with the evaporator 130 to receive the refrigerant therefrom. In the present examples, the absorbent may be a lithium bromide (LiBr) solution without any limitations. The absorber 132 is configured for absorbing the refrigerant by the absorbent. The VAR system 104 further includes a desorber 134 disposed in connection with the absorber 132. The desorber 134 is configured for heating the refrigerant and the absorbent to obtain vapors of the refrigerant. The VAR system 104 further includes an unmixed heat exchanger 136 to exchange heat exiting from the desorber 134 and a solution exiting from the absorber 132 (as discussed later in more detail). The VAR system 104 further includes a condenser 138 disposed in connection with the desorber 134. The condenser 138 is configured for condensing the vapors of the refrigerant. As shown, the condenser 138 is disposed in connection with the evaporator 130. The VAR system 104 may also include a throttling valve, referred to as a first throttling valve and represented by reference numeral 140, disposed between the condenser 138 and the evaporator 130. The first throttling valve 140 is configured to expand the refrigerant exiting from the condenser 138, before entering the evaporator 130.

As discussed, the VAR system 104 may be a DE-VAR system. Such a DE-VAR system 104 may have the desorber 134 including two desorber units, namely a first desorber 142 and a second desorber 144. Herein, each of the desorbers 142, 144 acts as a separate regenerator (as discussed later). Further, the DE-VAR system 104 may have the unmixed heat exchanger 136 including two unmixed heat exchanger units, namely a first unmixed heat exchanger 146 and a second unmixed heat exchanger 148. The VAR system 104 may further include two solution pumps, namely a first solution pump 150 and a second solution pump 152; with the first solution pump 150 disposed at a connection between the second unmixed heat exchanger 148 and the first unmixed heat exchanger 146, and the second solution pump 152 disposed at a connection between the absorber 132 and the second unmixed heat exchanger 148. The VAR system 104 may also include additional throttling valves, specifically three more throttling valves, namely a second throttling valve 154, a third throttling valve 156 and a fourth throttling valve 158, with their functionalities described later in detail.

As may be contemplated by a person skilled in the art, in operation of the VAR system 104, the refrigerant enters the condenser 138 at high pressure and temperature and gets condensed, and releases heat in a later process. Further, the refrigerant passes through the first throttling valve 140, where pressure and temperature of the refrigerant is reduced. Further, the refrigerant at low pressure and temperature enters the evaporator 130 and produces the cooling effect. Furthermore, the refrigerant from the evaporator 130 enters the absorber 132, where the refrigerant is absorbed by the absorbent, generating heat, due to which the pressure inside the absorber 132 reduces, leading to more flow of the refrigerant from the evaporator 130 to the absorber 132. As may be contemplated, at high temperature, the absorbent absorbs less refrigerant, hence the generated heat in the absorber 132 needs to be removed to increase absorption capacity of the absorber 132.

As may be seen from FIG. 1, the HDH system 102 and the VAR system 104 are connected at the absorber 132 and the condenser 138 so that the carrier gas, after passing through the humidifier 112, is configured to absorb heat from the absorber 132 and the condenser 138, before entering the dehumidifier 114. For this purpose, the first outlet 122a of the humidifier 112 is connected to an inlet 160 of the absorber 132 and the second outlet 122b of the humidifier 112 is connected to an inlet 162 of the condenser 138. Further, an outlet 164 of the absorber 132 is connected to the first inlet 124a of the dehumidifier 114 and an outlet 166 of the condenser 138 is connected to the second inlet 124b of the dehumidifier 114. Herein, a first portion of the carrier gas exits from the first outlet 122a of the humidifier 112 and a second portion of the carrier gas exits from the second outlet 122b of the humidifier 112. In an example, the first portion of the carrier gas is about 50-70 vol. %, preferably 55%-65%, preferably 57%-63% or any values therebetween, of the carrier gas. In some examples, as may be appreciated, the humidifier 112 may include a single outlet (instead of two outlets 122a, 122b) with a single connection which may diverge (divide) into two connections to provide the first portion of the carrier gas and the second portion of the carrier gas therefrom; and further, the dehumidifier 114 may include a single inlet (instead of two inlets 124a, 124b) with two connections converging to form a single connection to receive the first portion of the carrier gas and the second portion of the carrier gas from the VAR system 104 (as discussed), without departing from the spirit and the scope of the present disclosure. In an aspect of the present disclosure, the system 100 may include a controller (see FIG. 8 and discussed later in the description in more detail) configured to adjust volumes of the first portion of the carrier gas exiting from the first outlet 122a of the humidifier 112 and the second portion of the carrier gas exiting from the second outlet 122b of the humidifier 112.

In the VAR system 104, the absorber 132 is cooled by the first portion of the carrier gas. In particular, the absorber 132 includes a first heat exchanger 170 for the first portion of the carrier gas to absorb latent heat of the absorbing the refrigerant by the absorbent therefrom. Further, the condenser 138 is cooled by the second portion of the carrier gas. In particular, the condenser 138 includes a second heat exchanger 172 for the second portion of the carrier gas to absorb latent heat of the condensing the vapors of the refrigerant therefrom. More specifically as shown in FIG. 1, as the absorber 132 is cooled by the first portion of the carrier gas, the absorber 132 dilutes a weak solution (as represented by S16) coming from the second desorber 144 by mixing the weak solution with the vapor of refrigerant (as represented by S20) coming from the evaporator 130.

In aspects of the present disclosure, the unmixed heat exchanger 136 is implemented for a weak solution exiting from the desorber 134 to exchange heat with a strong solution exiting from the absorber 132. Particularly, the first unmixed heat exchanger 146 is configured for the first portion of the strong solution to exchange heat with the weak solution existing from the first desorber 142, and the second unmixed heat exchanger 148 is configured for the strong solution exiting from the absorber 132 to exchange heat with a mixed solution existing from the second desorber 144. That is, a strong solution (as represented by S1) is pumped by the second solution pump 152 (as represented by S2) to pass through the second unmixed heat exchanger 148 to gain some heat (as represented by S3) from the mixed solution that passes through the second desorber 144 (as represented by S14 and S15). The strong solution (S3) is then split into two portions, of which one portion (as represented by S4) enters the second desorber 144 and another portion (as represented by S5) is pumped by the first solution pump 150 (as represented by S6) to pass through the first unmixed heat exchanger 146 (as represented by S7) to gain some additional heat before entering the first desorber 142. In the present examples, the controller is configured to adjust volumes of the first portion (S5, S6) of the strong solution entering the first desorber 142 and a second portion (S4) of the strong solution entering the second desorber.

In aspects of the present disclosure, the first desorber 142 is configured to receive heat for heating the refrigerant and the absorbent to obtain the vapors of the refrigerant. Herein, the first desorber 142 includes a heat exchanger 174 for the said purpose. That is, thermal power is supplied to the first desorber 142 such that the strong solution evaporates (vapor as represented by S8) to leave the first desorber 142, while the remaining strong solution becomes a weak solution (as represented by S9) and exits from the first desorber 142 to be passed to the second unmixed heat exchanger 148 to heat the strong solution (as mentioned above), via the first unmixed heat exchanger 146 and the second desorber 144 (as shown). Further, the weak solution (as represented by S10) after exiting the second unmixed heat exchanger 148 passes through the second throttling valve 154 to reduce its pressure (as represented by S11), and is then passed to the second desorber 144.

In aspects of the present disclosure, the second desorber 144 is configured for mixing the second portion of the strong solution and the weak solution exiting from the first unmixed heat exchanger 146 to obtain a mixed solution S14. Further, the second desorber 144 comprises a heat exchanger 176 configured for the vapors of the refrigerant exiting from the first desorber 142 to exchange heat with the mixed solution. That is, in the second desorber 144, the second portion of the strong solution (S4) is mixed with the weak solution (S11), and the mixture is further heated by water vapor (S8) that comes from the first desorber 142. Further, some of the solution evaporates to leave the second desorber 144 as water vapor (as represented by S12), while other water vapor (as represented by S13) from the second desorber 144 passes through the third throttling valve 156 (as represented by S17), to condense in the condenser 138. Also, as discussed, the mixed solution (S14) from the second desorber 144 passes through the second unmixed heat exchanger 148 to lose heat (S15) and then passes through the fourth throttling valve 158 to be at the absorber pressure (S16).

In aspects of the present disclosure, the throttling valve 140 is configured to expand the refrigerant exiting from the condenser 138. That is, the condensed water from the condenser 138 (as represented by S18) is expanded in the first throttling valve 140 (as represented by S19) before entering the evaporator 130. Further, the evaporator 130 cools chilled water (as represented by S21 and S22) for air conditioning purposes while the evaporated water (S20) is passed to the absorber 132 (as discussed in the preceding paragraphs).

Furthermore, in the HDH system 102, the saline water (as represented by A9) passes through the piping network 115 (as represented by A10) in the dehumidifier 114. The saline water, then, is sprayed by the sprayer 116 in the humidifier 112 over the packed material 118. The packed material 118 is used to increase mass and heat exchanges between air and water streams in the humidifier 112. The sprayed saline water exchanges heat and water content with the circulated air from the dehumidifier 114 via the air blower 120 (as represented by A1 and A2). The first portion of the carrier gas (i.e., some water being carried by air (humid air)) leaves the humidifier 112 from the first outlet 122a (as represented by A3), and the second portion of carrier gas (humid air) leaves the humidifier 112 from the second outlet 122b (as represented by A4), while the brine (as represented by A5) is discarded from the brine outlet 126 at a bottom of the humidifier 112. Herein, the humid air portion (A3) is used to cool the absorber 132 (thus, also referred to as an air-cooled absorber 132) and gain some heat (as represented by A6), and the second portion of carrier gas (A4) is used to cool the condenser 138 (thus, also referred to as an air-cooled condenser 138) and to obtain some heat (as represented by A7). The saline water (A10), at generally low temperature, is used to condense the humid air (A6 and A7) in the dehumidifier 114 to produce desalinated water (as represented by A8), which is discharged from the desalinated water outlet 128 at a bottom of the dehumidifier 114. This, in turn, raises the temperature of the saline water (A9 to A10) to be used in the humidifier 112 (as discussed above).

In one embodiment, the first heat exchanger 170 is an unmixed heat exchanger, meaning that the first portion of the carrier gas (A3) does not mix with a solution of the refrigerant and the absorbent. In another embodiment, the first heat exchanger 170 is a mixed heat exchanger. That is, the first portion of the carrier gas (A3) is in fluid contact with the solution. The first portion of the carrier gas (A3) may thus absorb water from the solution when heated inside the first heat exchanger 170. Additional water may be periodically or constantly added to the absorber 132 or another component of the HDH system 104. While not shown, the first heat exchanger 170 can include a first portion and a second portion. The refrigerant (S20) mixes with, or rather is absorbed by, the weak solution (S16) in the first portion to form a strong solution, which will eventually exit the absorber 132 as the strong solution (S1). In the second portion, the strong solution exchanges heat with the first portion of the carrier gas (A3). When the first heat exchanger 170 is a mixed heat exchanger, the second portion may include a sparger to generate bubbles of the first portion of the carrier gas (A3) into the strong solution.

In one embodiment, the second heat exchanger 172 is an unmixed heat exchanger, meaning that the second portion of the carrier gas (A4) does not mix with water vapors S12 and S17. In another embodiment, the second heat exchanger 172 is a mixed heat exchanger. That is, the second portion of the carrier gas (A4) is in fluid contact with the water vapors S12 and S17. The second portion of the carrier gas (A4) may thus absorb water from the water vapors S12 and S17 when heated inside the second heat exchanger 172. Additional water may be periodically or constantly added to the condenser 138 or another component of the HDH system 104.

The term "heat exchanger" is used to include any heat exchange mechanism through which a coolant or a heat transfer medium can circulate. In some examples, the heat exchanger may include one or more discrete heat exchange devices coupled in series or in parallel. The heat exchanger may include any type of heat exchanger, such as a plate-type heat exchanger, a shell-type heat exchanger, a double-pipe heat exchanger or the like, which generally provides an enlarged effective heat exchanging area by, for example, being corrugated and/or provided with protruding portions of some suitable kind, such as flanges, to allow for heat transfer between two fluids.

In some embodiments, the humidifier 112 is configured such that the saline water sprayed out of the sprayer 116 does not immediately flow out via the water outlet 126. That is, the amount of sprayed saline water per unit time and the size of the water outlet 126 are designed such that there is a saline water column at a bottom of the humidifier 112 during operation. The air blower 120 can be connected to the bottom of the humidifier 112 so that an air flow A2 passes through the saline water column from a bottom of the saline water column. A sparger can be included at the bottom of the humidifier 112 to generate bubbles using the air flow A2 to increase contact between the air flow A2 and the saline water column to promote humidification. Further, the air blower 120 can be connected to the bottom of the humidifier 112 via a plurality of air pipes at a plurality of locations at the bottom of the humidifier 112. The plurality of locations can be arranged in various patterns, for example in a hexagonal array or in a square array. In other words, the air flow A2 can be split into a plurality of portions, each of which enters the bottom of the humidifier 112 separately and is sparged by a respective sparger to promote humidification.

The spargers are preferably arranged in a hexagonal array such that each sparger is equidistant from an interior wall of the humidifier 112 at the bottom of the humidifier 112, more preferably, the distance from the wall of the humidifier to the sparger and the distance between opposing spargers in the hexagonal array are the same. This configuration provides an advantageous flow of air through the saline water column by the airflow A2. The spargers may be in the form of upturned nozzles that are substantially the same as the nozzles at the top of the humidifier 116 for spraying saline water into the humidifier 112.

In a further preferred embodiment the saline water in 114 is at least partially connected to the incoming airflow A1 representing the suction side to the air blower 120. This embodiment utilizes the Bernoulli principle whereby the incoming flow of air to the pump 120 functions to siphon or pull at least a portion of the saline water from the bottom of 114 into the air flow A1. Preferably the incoming air is connected to the outlet for the saline solution A8. When configured in this manner the air blower 120 blows a fine mist of saline water into a dehumidifier 112.

Figure 2:
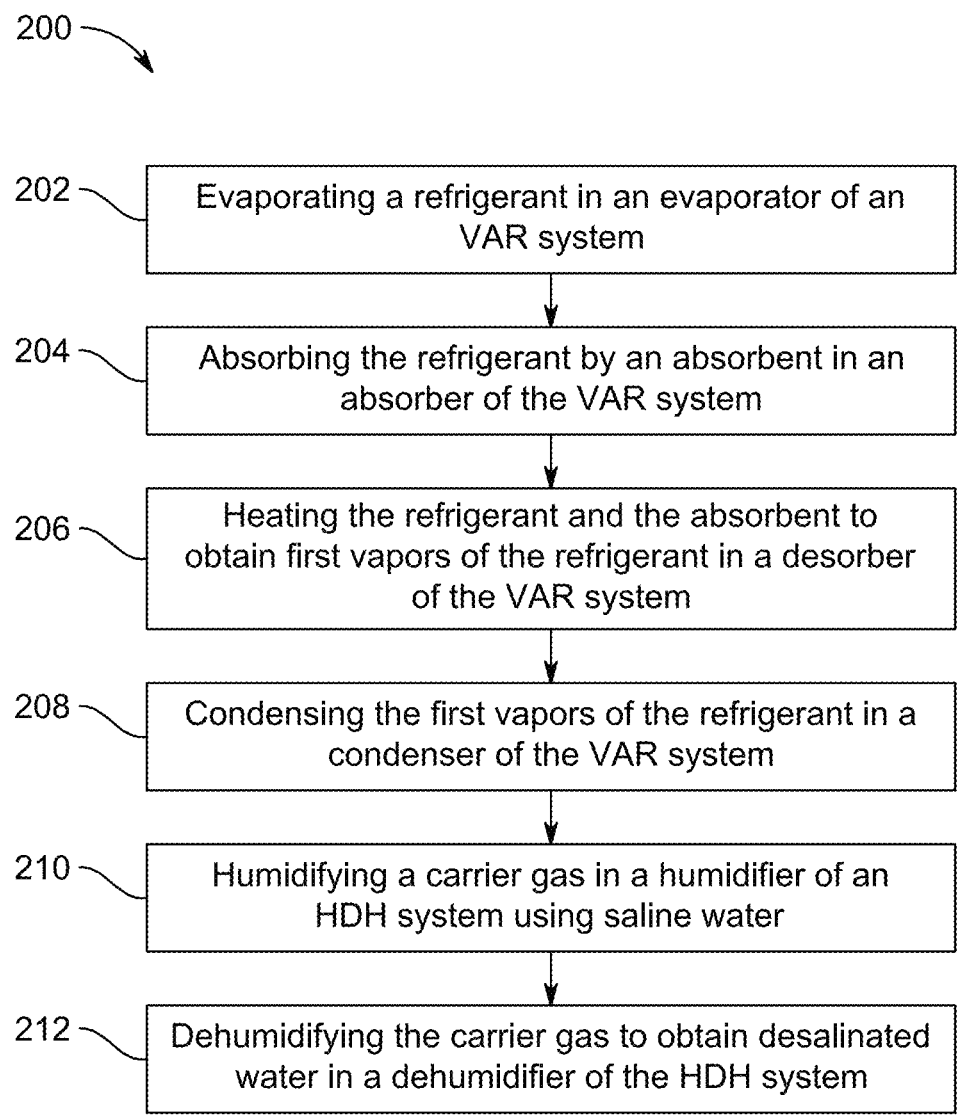
FIG. 2 is an exemplary flowchart of a method for concurrent cooling and desalination, according to certain embodiments.

Referring to FIG. 2, illustrated is a flowchart of a method 200 for concurrent cooling and desalination. The various embodiments and variants disclosed above apply to the present method 200 without any limitations. Further, it may be appreciated that the steps described in reference to the method 200 are only illustrative, and other alternatives may also be provided where one or more steps are re-ordered, one or more steps are added, or one or more steps are removed without departing from the spirit and the scope of the present disclosure.

At step 202, the method 200 includes evaporating the refrigerant in the evaporator 130 of the VAR system 104. Herein, the refrigerant at low pressure and temperature enters the evaporator 130 and produces the cooling effect. Further, the evaporator 130 cools chilled water for air conditioning purposes while the evaporated water is passed to the absorber 132.

At step 204, the method 200 includes absorbing the refrigerant by the absorbent in the absorber 132 of the VAR system 104. That is, the refrigerant from the evaporator 130 enters the absorber 132, where the refrigerant is absorbed by the absorbent, generating heat, due to which the pressure inside the absorber 132 reduces, leading to more flow of the refrigerant from the evaporator 130 to the absorber 132.

At step 206, the method 200 includes heating the refrigerant and the absorbent to obtain first vapors of the refrigerant in the desorber 134 of the VAR system 104. The desorber 134 is disposed in connection with the absorber 132. The desorber 134 is configured to heat the refrigerant and the absorbent to obtain vapors of the refrigerant. Further, the unmixed heat exchanger 136 is configured to exchange heat between the weak solution exiting from the desorber 134 and a strong solution exiting from the absorber 132.

At step 208, the method 200 includes condensing the first vapors of the refrigerant in the condenser 138 of the VAR system 104. Herein, the condenser 138 is disposed in connection with the desorber 134. The condenser 138 is configured for condensing the first vapors of the refrigerant. Also, the condenser 138 is disposed in connection with the evaporator 130. Further, the first throttling valve 140 is disposed between the condenser 138 and the evaporator 130. The first throttling valve 140 is configured to expand the refrigerant exiting from the condenser 138, before entering the evaporator 130.

At step 210, the method 200 includes humidifying the carrier gas in the humidifier 112 of the HDH system 102 using the saline water. Herein, the saline water source 110 is connected to the piping network 115, which passes through the dehumidifier 114, with a portion thereof disposed inside the inner volume of the dehumidifier 114, and ends at the inner volume of the humidifier 112. The sprayer 116 receives the saline water from the piping network 115, and sprays the received saline water inside the inner volume of the humidifier 112. Also, the air blower 120 generates an air flow and/or air bubbles, and a water pump (not shown) transfers saline water from the dehumidifier 114 to the humidifier 112. Thereby, the humidifier 112 humidifies the carrier gas, (which, in the present examples, includes air) using the saline water.

At step 212, the method 200 includes dehumidifying the carrier gas to obtain the desalinated water in the dehumidifier 114 of the HDH system 102. Herein, the humidified carrier gas from the humidifier 112 is heated before being passed to the dehumidifier 114 for condensation therein. The saline water passing through the piping network 115 in the dehumidifier 114 may gain heat from the humidified carrier gas, which, in turn, causes the humidified carrier gas to get condensed in the dehumidifier 114 to obtain the desalinated water therefrom.

In the method 200, the carrier gas, after the humidifying, is configured to absorb heat from the absorber 132 and the condenser 138, before the dehumidifying. Herein, as discussed, the HDH system 102 and the VAR system 104 are connected at the absorber 132 and the condenser 138 so that the carrier gas, after passing through the humidifier 112, is configured to absorb heat from the absorber 132 and the condenser 138. The HDH system 102 utilizes the waste heat of the VAR system 104, to heat the humidified carrier gas from the humidifier 112 before being passed to the dehumidifier 114 for condensation therein.

In some aspects, the method 200 includes splitting the carrier gas, after the humidifying, into the first portion and the second portion. Herein, the first portion of the carrier gas exits from the first outlet 122a of the humidifier 112 and the second portion of the carrier gas exits from the second outlet 122b of the humidifier 112. In the present examples, as discussed, the controller is configured to adjust volumes of the first portion of the carrier gas exiting from the first outlet 122a of the humidifier 112 and the second portion of the carrier gas exiting from the second outlet 122b of the humidifier 112. The method 200 further includes passing the first portion of the carrier gas through the absorber 132, and passing the second portion of the carrier gas through the condenser 138. For this purpose, the first outlet 122a of the humidifier 112 is connected to the inlet 160 of the absorber 132 and the second outlet 122b of the humidifier 112 is connected to the inlet 162 of the condenser 138. Also, the outlet 164 of the absorber 132 is connected to the first inlet 124a of the dehumidifier 114 and the outlet 166 of the condenser 138 is connected to the second inlet 124b of the dehumidifier 114.

Herein, the first portion of the carrier gas is configured to absorb latent heat of the absorbing the refrigerant by the absorbent, and the second portion of the carrier gas is configured to absorb latent heat of the condensing the vapors of the refrigerant, as the HDH system 102 and the VAR system 104 are connected at the absorber 132 and the condenser 138. This way the carrier gas, after passing through the humidifier 112, is configured to absorb heat from the absorber 132 and the condenser 138, before entering the dehumidifier 114.

In some aspects of the method 200, the first portion of the carrier gas is about 50-70 vol. %, or any values therebetween, of the carrier gas. That is, the first portion of the carrier gas is about 50 vol. %, 55 vol. %, 60 vol. %, 65 vol. %, or up to 55 vol. %, 60 vol. %, 65 vol. %, or 70 vol. %, of the carrier gas. Thereby, the second portion of the carrier gas is about 30-50 vol. %, or any values therebetween, of the carrier gas. That is, the second portion of the carrier gas is about 30 vol. %, 35 vol. %, 40 vol. %, 45 vol. %, or up to 35 vol. %, 40 vol. %, 45 vol. %, or 50 vol. % of the carrier gas. With the absorber 132 expelling more heat as compared to the condenser 138 in the VAR system 104, such proportions for the first portion and the second portion of the carrier gas may be suitable for the HDH system 102 to effectively extract (gain) most of the thermal energy from the VAR system 104.

The method 200 further includes combining the first portion of the carrier gas and the second portion of the carrier gas before the dehumidifying. As discussed, in the VAR system 104, the absorber 132 is cooled by the first portion of the carrier gas, with the first portion of the carrier gas absorbing the latent heat of the absorbing the refrigerant by the absorbent therefrom. Further, the condenser 138 is cooled by the second portion of the carrier gas, with the second portion of the carrier gas absorbing the latent heat of the condensing the vapors of the refrigerant therefrom. Since, the outlet 164 of the absorber 132 is connected to the first inlet 124a of the dehumidifier 114 and the outlet 166 of the condenser 138 is connected to the second inlet 124b of the dehumidifier 114, the heated first portion of the carrier gas and the second portion of the carrier gas are received together in the dehumidifier 114.

The method 200 further includes splitting the strong solution (S1, S2 in FIG. 1) into the first portion (S5 in FIG. 1) and the second portion (S4 in FIG. 1), the strong solution (S1, S2) comprising the refrigerant and the absorbent exiting from the absorber 132. The method 200 further includes passing the first portion of the strong solution (S6 in FIG. 1) through the first unmixed heat exchanger 146. The method 200 further includes heating the first portion of the strong solution (S7 in FIG. 1) in the first desorber 142 to obtain the first vapors of the refrigerant (S8 in FIG. 1) and a weak solution (S9 in FIG. 1). The method 200 further includes passing the weak solution (S9) through the first unmixed heat exchanger 146.

The method 200 also includes mixing the weak solution (S11 in FIG. 1, after stages S9 and S10 of FIG. 1) and the second portion of the strong solution (S4) to obtain a mixed solution (S14 in FIG. 1) in the second desorber 144. The method 200 further includes passing the first vapors of the refrigerant (S8) through the second desorber 144 for heat exchange between the mixed solution (S14) and the first vapors of the refrigerant (S8) to obtain second vapors of the refrigerant (S12 in FIG. 1) from the mixed solution (S14). The method 200 further includes condensing the first vapors of the refrigerant (S17 in FIG. 1, from S8 after stage S13 of FIG. 1) and the second vapors of the refrigerant (S12) in the condenser 138.

The method 200 also includes passing the strong solution (S2) through the second unmixed heat exchanger 148 before the splitting the strong solution (into S4 and S5). The method 200 further includes passing the mixed solution (S14) through the second unmixed heat exchanger 148. The method 200 further includes passing the mixed solution (S16 in FIG. 1, from S14 after stage S15 of FIG. 1) through the absorber 132 such that the refrigerant (S20 in FIG. 1), which exits from the evaporator 130, is absorbed by the weak solution (S1 in FIG. 1).

In the present method 200, the carrier gas includes air. Thus, the absorber 132 and the condenser 138 of the VAR system 104 are air-cooled components. Further, in the method 200, the refrigerant includes water and the absorbent includes lithium bromide. Thus, the method 200 provides coupling of the air-heated HDH system 102 with the VAR system 104 by circulating the air from the HDH system 102 to cool the absorber 132 and the condenser 138 of the VAR system 104 and concurrently driving the HDH system 102. In addition to fewer corrosive issues compared to water-heated HDH systems, the preset air-heated HDH system 102 may produce more fresh water and achieve better performance by discarding heat from two components (i.e., the absorber 132 and the condenser 138), while using environmentally friendly refrigerants (i.e., lithium bromide).

Experimental Data

In the present disclosure, as discussed, the air stream of the HDH system 102 is heated by the absorber 132 and the condenser 138 of the DE-VAR system 104, and concurrently the absorber 132 and the condenser 138 are cooled. One difference between the present system 100 and known systems [for example, See: N. A. A. Qasem, S. M. Zubair, A. M. Abdallah, M. H. Elbassoussi, M. A. Ahmed, Novel and efficient integration of a humidification-dehumidification desalination system with an absorption refrigeration system, Appl. Energy 263 (2020) 114659] is that the present system 100 uses an air-cooled absorber, an air-cooled condenser, and an air-heated HDH system. The present experimental data discuss the influential parameters on the performance of the system 100 such as the fraction of HDH airflow heated by the absorber 132, HDH mass flow rate ratio (saline water mass flow rate over air mass flow rate), saline water amounts, saltwater salinity, and the driving power. The present system 100 is expected to produce more water production and a higher cooling capacity than those of the water-heated HDH-VAR systems and standalone HDH systems by several folds. An economic assessment is also conducted to prove the feasibility of the present system 100 to be a promising candidate for both water and cooling productions.

The following nomenclature was used for purposes of the present disclosure, as listed in Table 1 below.

TABLE 1

Nomenclature

| Abbreviations | | | |
|---|---|---|---|
| COP | coefficient of performance | i | interest rate |
| DE-VAR | double-effect vapor-absorption refrigerator | l | operating labor cost, $/m$^3$ |
| EES | engineering equation solver | MR | mass flow rate ratio, $kg_{sw}/kg_a$ |
| GOR | gained output ratio | n | system expected life, years |
| HDH | humidification-dehumidification | $P_h$ | high-pressure, kPa |
| HX | heat-exchanger | $P_l$ | low-pressure, kPa |
| LiBr | lithium bromide | $P_m$ | medium-pressure, kPa |
| TR | ton of refrigeration (1 TR = 3.51685 kW) | S | salinity, g/kg |
| VAR | vapor-absorption refrigerator | s | specific entropy, kJ/kg.K |
| VAR | vapor-compression refrigerator | T | temperature, ° C. |
| Symbols | | UA | overall heat transfer coefficient, kW/K |
| $ | United States dollar | | |
| Sgen | entropy generation, kW/K | Greek symbols | |
| $h_{fg}$ | latent heat of condensation, kJ/kg | α | amortization charge |
| W | pumping power, kW | ε | effectiveness |
| Q | heat transfer rate, kW | η | efficiency |
| m | mass flowrate, kg/s | Subscripts | |
| $C_{cooling}$ | unit cost of cooling effect, $/kWh | Abs | absorber |
| $C_F$ | annual capital cost, $ | Cond | condenser |
| $C_G$ | annual cost of natural gas, $ | Comb | combustion |
| $C_L$ | annual labor cost, $ | d | dehumidifier |
| $C_M$ | annual maintenance cost, $ | Des | desorber |
| $C_{Mg}$ | annual management cost, $ | Evap | evaporator |
| $C_{pw}$ | unit cost of freshwater produced, $/m | h | humidifier |
| $C_T$ | total annual cost, $ | ht | heating source |
| f | system availability | pw | water production |
| FR | fraction of water production power to the total power of products | sw | saline water |

Under the investigated conditions, the present system 100 and the method 200 produce water amounts of about 2100.0 Uh and a cooling effect of 104.0 tons of refrigeration, with a gained output ratio (GOR) of 4.7, a coefficient of performance (COP) of 1.2, energy utilization factor (EUF) of 5.9, water cost of 2.5 $/m3, and cooling effect cost of 0.0037 $/kWh. In addition, the present system 100 outperforms the standalone air-heated HDH system in terms of water production, GOR, EUF, and water cost reduction by a factor of about 2.3, 2.4, 3.0, and 2.4 times, respectively. Compared to a standalone DE-VAR system, the present system 100 and the present method 200 show a smaller cooling capacity reduced by about 10% but with a significant reduction in the cooling cost by about 3.8 times and improved EUF by about 4.2 times. Additionally, the present system 100 and the present method 200 show excellent economic feasibility under different salinities.

Mathematical Modeling

In the present disclosure, a model was implemented for the system 100 which relies upon mass, energy, solution, salinity balances based on some adopted assumption as follows:

- Both the HDH system 102 and the VAR system 104 are operated under steady-state processes.
- The components of both the HDH system 102 and the VAR system 104 are well insulated (adiabatic walls) and well-sealed.
- Stable and homogeneous LiBr solution.
- The inlet saline water is at ambient conditions (25° C. and 101.3 kPa).
- Humid air is saturated at the exit of the humidifier and dehumidifier.
- The inlet and exit temperatures of chilled water are 12° C. and 7° C., respectively, to satisfy the standard of Air-conditioning, Heating, and Refrigeration Institute (AHRI).
- HDH operates at atmospheric pressure, 101.3 kPa; thus, the pumping power may be ignored compared to the inlet energy. However, the pumping power is considered for the economic analysis and HDH performance calculation.

System Performance Indicators

As the integrated system produces water and cooling effect, the water production ($\dot{m}_{pw}$) and cooling capacity ($\dot{Q}_{Evap}$) are the primary performance indices. Besides, a gained output ratio (GOR, the ratio of condensation heat of water vapor to the total input energy of both systems, since VAR drives the HDH) and a coefficient of performance (COP, the ratio of cooling load to the total input energy of VAR) are usually used to assess the performance of HDH and refrigeration systems, respectively. They are expressed as, $$GOR = \frac{\dot{m}_{pw} h_{fg}}{\dot{Q}_{ht} + \dot{W}_{Pump\#1} + \dot{W}_{Pump\#2} + \dot{W}_{HDH}} \quad (1)$$

The condensation heat, $h_{fg}$, is taken at the average temperature of the dehumidifier air streams (i.e., $T_{a8}$ and $T_{a1}$).

$$COP = \frac{\dot{Q}_{Evap}}{\dot{Q}_{ht} + \dot{W}_{Pump\#1} + \dot{W}_{Pump\#2}} \quad (2)$$

The total energy performance of the integrated system considers both condensation energy and cooling capacity and is usually defined as the energy utilization factor (EUF). EUF may be introduced as, $$EUF = \frac{\dot{m}_{pw} h_{fg} + \dot{Q}_{Evap}}{\dot{Q}_{ht} + \dot{W}_{Pump\#1} + \dot{W}_{Pump\#2} + \dot{W}_{HDH}} \quad (3)$$

Operating Conditions

The typical operating and constructive parameters to evaluate the performance of the integrated system is listed in Table 2 below. These parameters are used unless others are mentioned.

TABLE 2

Typical operating and constructive parameters of the VAR-HDH system.

| Parameter | Value |
|---|---|
| Weak solution amount, $m_1$ | 1 kg/s |
| HDH mass flow rate ratio, MR | 0.9 $kg_{sw}/kg_a$ |
| Saline water mass flow rate, $m_{sw} = m_{23}$ | 40 kg/s |
| Saline water temperature, $T_{sw} = T_{23}$ | 25° C. |
| Saline water salinity, S | 35 g/kg |
| Fraction of HDH air amounts going to absorber, y | 0.6 |
| Chilled water inlet temperature, $T_{21}$ | 12° C. |
| Chilled water outlet temperature, $T_{22}$ | 7° C. |
| $UA_{Evap}$ | 85 kW/K |
| $UA_{Abs}$ | 50 kW/K |
| $UA_{Des\#1}$ | 25 kW/K |
| $UA_{Des\#2}$ | 10 kW/K |
| $UA_{Cond}$ | 65 kW/K |
| $UA_{HX\#1}$ | 2 kW/K |
| $UA_{HX\#2}$ | 1.25 kW/K |
| ED-VAR high-pressure, $P_h$ | $P_{sat}$ at $T_{13}$ |
| ED-VAR medium-pressure, $P_m$ | $P_{sat}$ at $T1_8$ |
| ED-VAR low-pressure, $P_l$ | $P_{sat}$ at $T_{20}$ |
| Pressure of HDH | 101.3 kPa |
| Efficiency of pumping devices, η | 0.72 |
| Effectiveness of humidifier, $\varepsilon_h$ | 0.85 |
| Effectiveness of dehumidifier, $\varepsilon_d$ | 0.85 |

Results Validity and Solution Method

Due to the use of effectiveness equations, entropy generation may be calculated to avoid any results that violate the second law of thermodynamics [See: N. A. A. Qasem, S. M. Zubair, Performance evaluation of a novel hybrid humidification-dehumidification (air-heated) system with an adsorption desalination system, Desalination 461 (2019) 37-54, incorporated herein by reference in its entirety]. These entropy generation equations are, $$\dot{S}_{gen,h} = \dot{m}_b S_{25} - \overline{\dot{m}}_{sw} S_{24} + \dot{m}_a (S_{a3} - S_{a2}) \geq 0 \quad (4)$$

$$\dot{S}_{gen,d} = \dot{m}_{sw}(s_{24} - s_{23}) + \dot{m}_a(s_{a1} - s_{a8}) + \dot{m} s_{26} s_{26} \geq 0 \quad (5)$$

The model was implemented using the engineering equation solver (EES) [See: EES: Engineering Equation Solver|F-Chart Software: Engineering Software 2020, incorporated herein by reference in its entirety], in which the thermal and physical properties of fluids are available. The modeling error is considered to be less than $10^{-6}$. This error is the default value in the EES software; however, the checked calculation's error for some parameters was found to be much less than $10^{-14}$. The thermodynamic properties of water, solution, and air are called based on some empirical relations (or tabulated values) available in EES. The saline water enthalpy and entropy are also available in the EES library based on empirical relations, within an error of less than 1.36% and 0.5%, respectively [See: M. H. Sharqawy, V. J. H. Lienhard, S. M. Zubair, Thermophysical properties of seawater: A review of existing correlations and data, Desalin. Water Treat. 29 (2011) 355, incorporated herein by reference in its entirety]. The saline water properties may also be found in references [See: M. M. Generous, N. A. A. Qasem, B. A. Qureshi, S. M. Zubair, A comprehensive review of saline water correlations and data-Part I: Thermodynamic properties, Arab J Sci Eng 45 (11) (2020) 8817-8876 and N. A. A. Qasem, M. M. Generous, B. A. Qureshi, S. M. Zubair, A Comprehensive Review of Saline Water Correlations and Data: Part II—Thermophysical Properties, Arab J Sci Eng 46 (3) (2021) 1941-1979, incorporated herein by reference in its entirety]. Further, for numerical studies, a sensitivity analysis based on the uncertainty formulation may be utilized to determine the most influential input parameters on the performance.

Economic Method

The cost estimation of products of the system 100 relies upon the annual capital, operating, maintenance, management, and labor costs. In this regard, some assumptions are adopted, for example:

The system driving power is produced from natural gas burning; thus, the system could be used in remote regions. The gas unit cost is taken as $4.0 per million metric British thermal units with a burning efficiency of 83.9%.

Pumps and blowers are powered by photovoltaic panels (PV).

The operating labor cost is taken as 0.1 $/m$^3$ [66], and 20% of this cost is considered for the management cost. Annual maintenance cost is 1.5% of the capital cost. System operating life (n) is 30 years, and its availability (f) is 0.9.

The interest rate (i) is 5%.

HDH pumping power (air blower and saline water pump) is taken based on a reported estimation as $\dot{W}_{HDH}=75\,\dot{m}_{pw}$ The capital cost of components is taken as a function of some operating or constructive parameters, as listed in Table 3 below. Herein, the given values for Table 3 may be obtained from references [See: H. Rostamzadeh, A. S. Namin, H. Ghaebi, M. Amidpour, Performance assessment and optimization of a humidification dehumidification (HDH) system driven by absorption-compression heat pump cycle, Desalination 447 (2018) 84-101; N. A. A. Qasem, S. M. Zubair, A. M. Abdallah, M. H. Elbassoussi, M. A. Ahmed, Novel and efficient integration of a humidification-dehumidification desalination system with an absorption refrigeration system, Appl. Energy 263 (2020) 114659; and Murphy C, Sun Y, Cole W, Maclaurin G, Turchi C, Mehos M, et al. The potential role of concentrating solar power within the context of DOE's 2030 solar cost targets. 2019, incorporated herein by reference in its entirety]. It is noted that the capital costs of pipes and fittings, accessories, control devices, and water tanks are assumed constant. The costs of these components are not as significant as others (e.g., if they change by ±50%, the change in the freshwater and cooling effect cost is about 0.3%).

TABLE 3

The capital cost of integrated system components

| Component | Capital/Investment cost |
|---|---|
| Desorbers | $2143\left(\dfrac{UA_{Des\#1}}{0.85}\right)^{0.541} + 2143\left(\dfrac{UA_{Des\#2}}{0.85}\right)^{0.541}$ |
| Absorber | $2143\left(\dfrac{UA_{Abs}}{0.85}\right)^{0.541}$ |
| Heat Exchangers | $2143\left(\dfrac{UA_{HX\#1}}{1.1}\right)^{0.541} + 2143\left(\dfrac{UA_{HX\#2}}{1.1}\right)^{0.541}$ |
| Condenser | $2143\left(\dfrac{UA_{Cond}}{1.1}\right)^{0.541}$ |
| Evaporator | $2143\left(\dfrac{UA_{Evap}}{1.1}\right)^{0.541}$ |
| Throttling valves | $114.5\,(\dot{m}_{10} + \dot{m}_{13} + \dot{m}_{15} + \dot{m}_{18})$ |
| PV system (annual) | $0.06\,(W_{Pump\#1} + W_{Pump\#2} + W_{HDH}) \times f \times 24 \times 365$ |
| Dehumidifier | $2143\left(\dfrac{\dot{m}_a(h_{a8}-h_{a1})}{1.4}\,\dfrac{\ln\left(\dfrac{T_{a8}-T_{24}}{T_{a1}-T_{23}}\right)}{(T_{a8}-T_{a24})-(T_{a1}-T_{a23})}\right)^{0.541}$ |
| Humidifier | $746.749\,\dot{m}_{sw}^{0.79}(T_{24}-T_{25})^{0.57}(T_{24}-T_{a3})^{-0.9924}(0.022 T_{a3}+0.39)^{2.447}$ |
| Pipes and fittings | 500 |
| Accessories | 300 |
| Control devices | 800 |
| Water tanks | 5000 |

The total capital cost (Cc) is the sum of those listed in Table 3, while the annual capital cost is expressed by, $$C_F = C_c \times \alpha \quad (6)$$

The amortization charge, $\alpha$, can be written as, $$\alpha = \frac{i \times (i+1)^n}{(i+1)^n - 1} \quad (7)$$

The annual cost of natural gas is evaluated by, $$C_G = \times \frac{COG}{293.071} \times \frac{\dot{Q}_{ht}}{\eta_{comb}} \times 24 \times 365 \quad (8)$$

where the value "293.071" is to convert the million metric British thermal units to kWh.

The annual operating labor ($C_L$), maintenance ($C_M$), and management ($C_{Mg}$) costs are given by, $$C_L = l \times f \times \frac{\dot{m}_{pw}}{1000} \times 3600 \times 24 \times 365 \quad (9)$$

$$C_M = 0.015 \times C_F \quad (10)$$

$$C_{Mg} = 0.20 \times C_L \quad (11)$$

The equations above may be used to calculate the annual total cost of the integrated system products in USD ($).

$$C_T = C_F + C_G + C_M + C_{Mg} + C_L \quad (12)$$

Because the system 100 produces water and cooling effect as primary products, the cost portions of water and cooling effects may be taken based on the HDH system 102 and the VAR system 104 performances. FR has been introduced as the fraction of useful energy of the HDH system 102 over the overall useful energy of the integrated system 100 (both the HDH system 102 and the VAR system 104); it is expressed as [See: D. U. Lawal, M. A. Antar, A. Khalifa, S. M. Zubair, F. Al-Sulaiman, Expenmental investigation of heat pump driven humidification-dehumidification desalination system for water desalination and space conditioning, Desalination 475 (2020), 114199, incorporated herein by reference in its entirety], $$FR = \frac{\dot{m}_{pw} h_{fg}}{\dot{Q}_{evap} + \dot{m}_{pw} h_{fg}} \quad (13)$$

The water production cost, in $/m³ is suggested to be:

$$C_{pw} = FR \frac{C_T}{f \times \dot{m}_{pw} \times 3600 \times 24 \times 365} \quad (14)$$

And the cost of cooling effect, in $/kWh, is given by:

$$C_{cooling} = (1 - FR) \frac{C_T}{f \times \dot{Q}_{evap} \times 24 \times 365} \quad (15)$$

Model Validation

Indeed, both experimental and numerical validations for the HDH system 102 and the VAR system 104 were tested in a previous study [See: N. A. A. Qasem, S. M. Zubair, A. M. Abdallah, M. H. Elbassoussi, M. A. Ahmed, Novel and efficient integration of a humidification-dehumidification desalination system with an absorption refrigeration system, Appl. Energy 263 (2020) 114659, incorporated herein by reference in its entirety]. Also, the code for the air-heated HDH system 102 was validated in a previous study [See: N. A. A. Qasem, S. M. Zubair, Performance evaluation of a novel hybrid humidification-dehumidification (air-heated) system with an adsorption desalination system, Desalination 461 (2019) 37-54, incorporated herein by reference in its entirety]. Thus, it may be concluded that the proposed model herein is robust and reliable to evaluate the present system 100.

Results and Discussion

The results are first discussed based on the performance of the integrated system 100. Then, economic results are assessed and compared to those of the existing systems in the literature. Finally, the performance and cost analyses under different salinities are tested. That is because the air stream of the HDH system 102 is used to cool the absorber 132 and the condenser 138 of the DE-VAR system 104, unlike the water-heated HDH system that uses saline water, which in turn could cause some corrosive issues to the absorber 132 and the condenser 138.

System Performance

The system 100 performance is investigated based on the controllable key parameters, such as driving power, split airflow going to the absorber 132 and the condenser 138, solution flow rate, MR, saline water flow rate. For typical operating conditions such as those listed in Table 2 (i.e., $\dot{m}_1$=1 kg/s, $m_{23}$=40 kg/s, MR=0.9, S=35 ppt, $T_{23}$=25° C., $T_{21}$=12° C., $T_{22}$=7° C., y=0.6), the performance of system in terms of water production, cooling capacity, GOR, COP, EUF is found to be 1841.1 L/h, 92.2TR, 4.1, 1.1, and 5.2, respectively. This good performance is achieved at the cost of 2.7$/m³ for water production and 0.0041$/kWh for cooling effect. In this operation, the amount of HDH air going to the absorber is 27.6 kg/s to reduce the temperature from 112.4° C. ($T_{16}$) to 50.4° C. ($T_1$), temperature from 94.9° C. ($T_{12}$) to 43.1° C. (Tie).

The gained temperature difference ($T_{28}$–$T_{23}$) for HDH is 22.1° C. which is used to enhance the mass and heat transfer to produce freshwater, so that the HDH system 102 as a cooler for the VAR system 104 also produces reasonable amounts of water. Additional cooling of the absorber 132 and the condenser 138 may be obtained by increasing the saline water mass flow rate.

Fraction of Airflow Rate Heated by Absorber

Figure 3A:
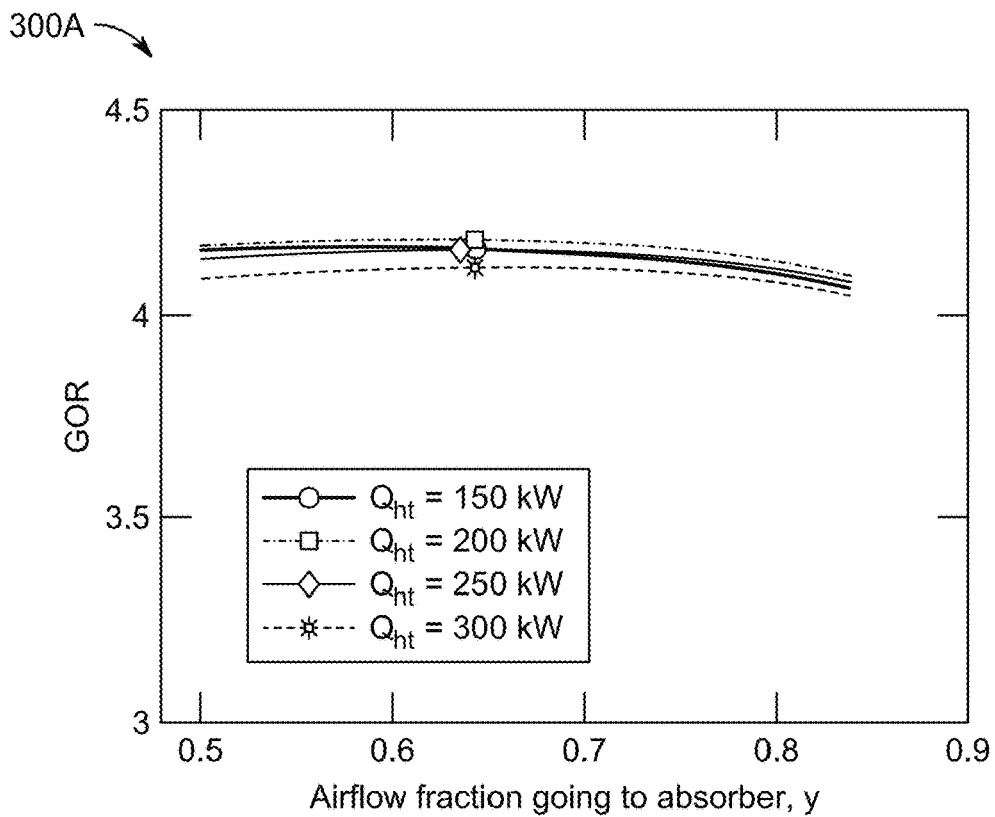
FIG. 3A illustrates a graph depicting a relationship between a fraction of airflow that cools the absorber and GOR.
Figure 3B:
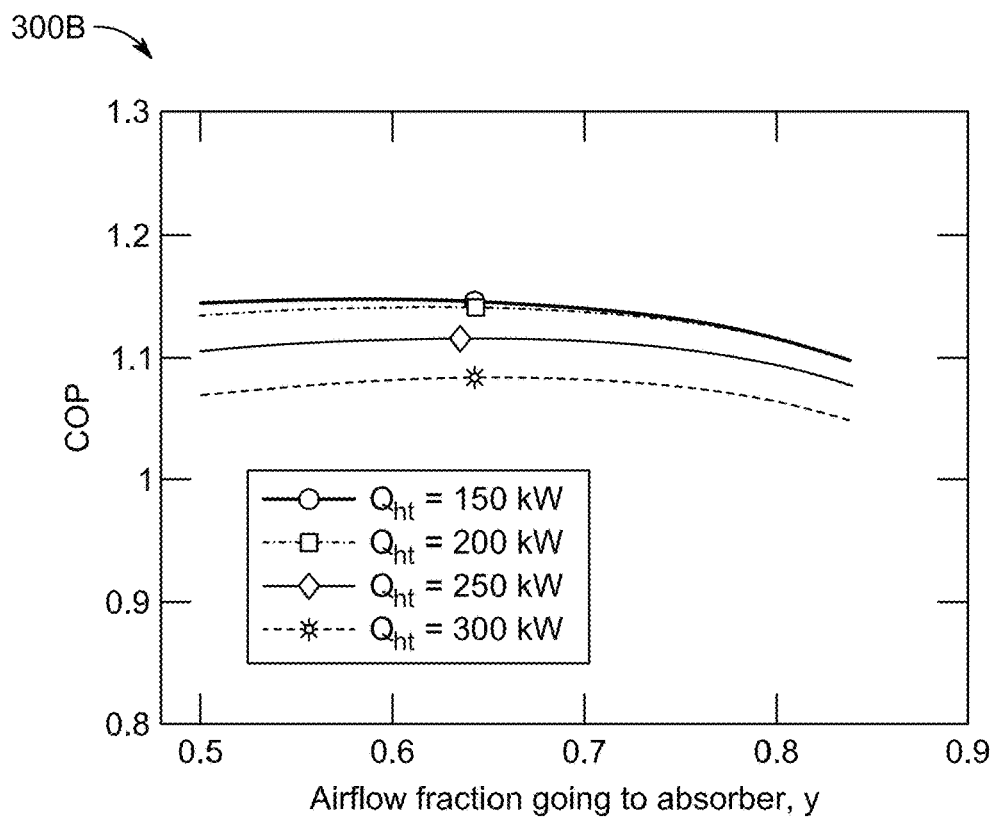
FIG. 3B illustrates a graph depicting a relationship between a fraction of airflow that cools the absorber and COP.
Figure 3C:
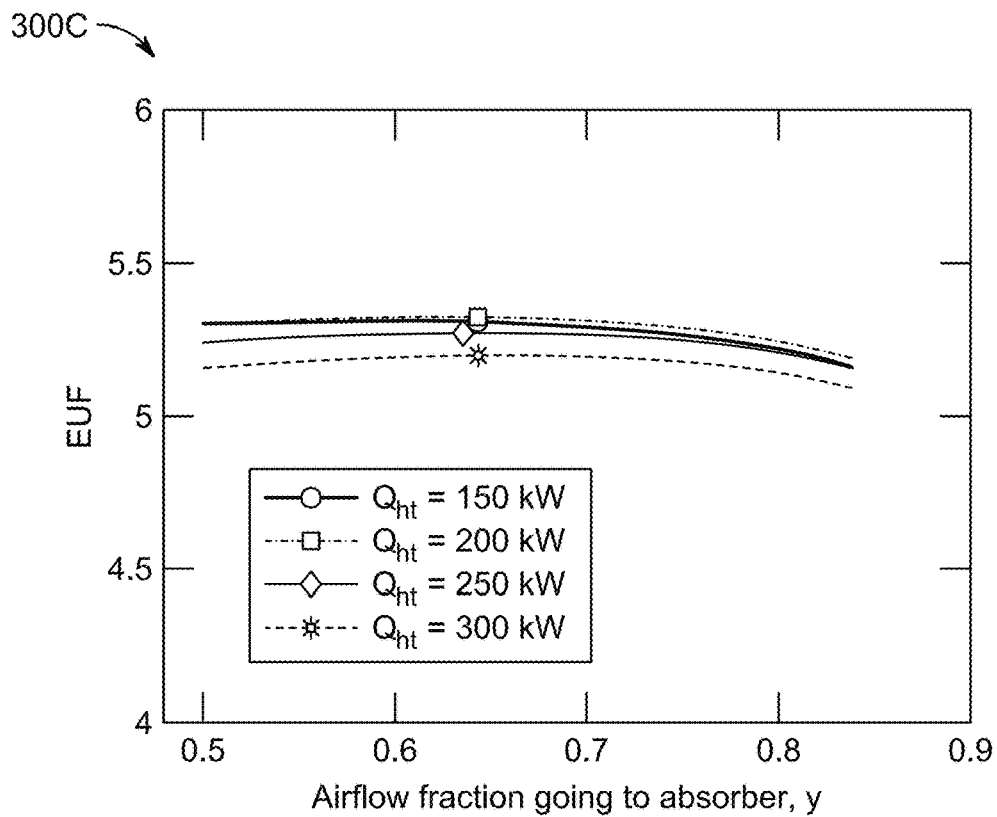
FIG. 3C illustrates a graph depicting a relationship between a fraction of airflow that cools the absorber and EUF.
Figure 3D:
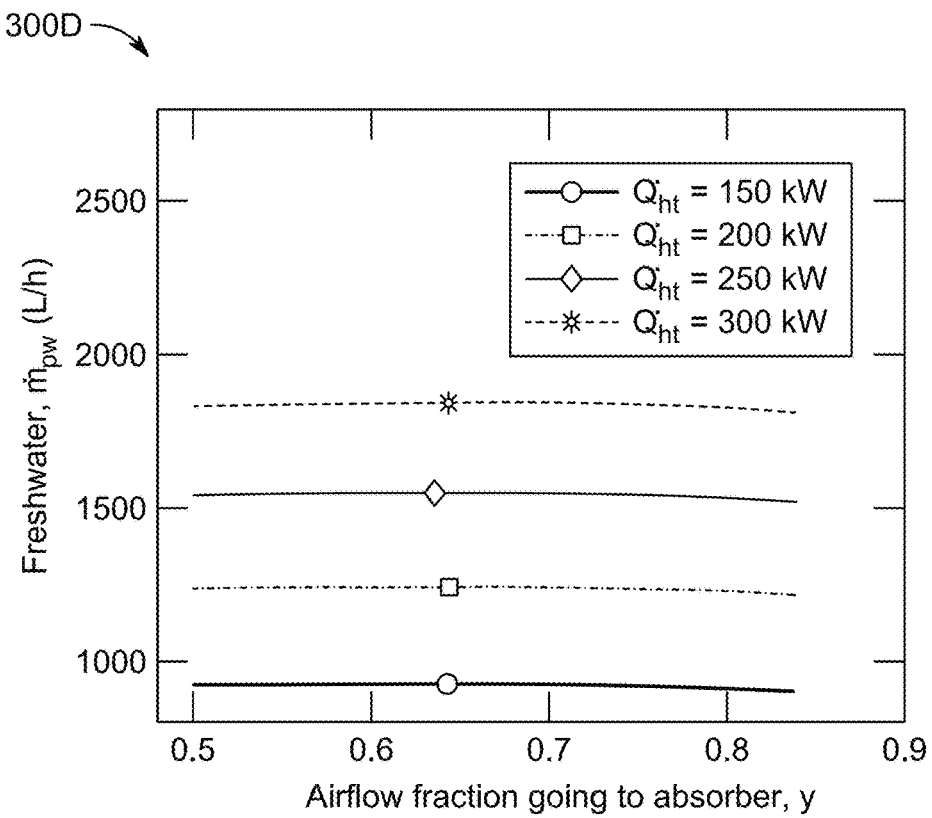
FIG. 3D illustrates a graph depicting a relationship between a fraction of airflow that cools the absorber and water production.
Figure 3E:
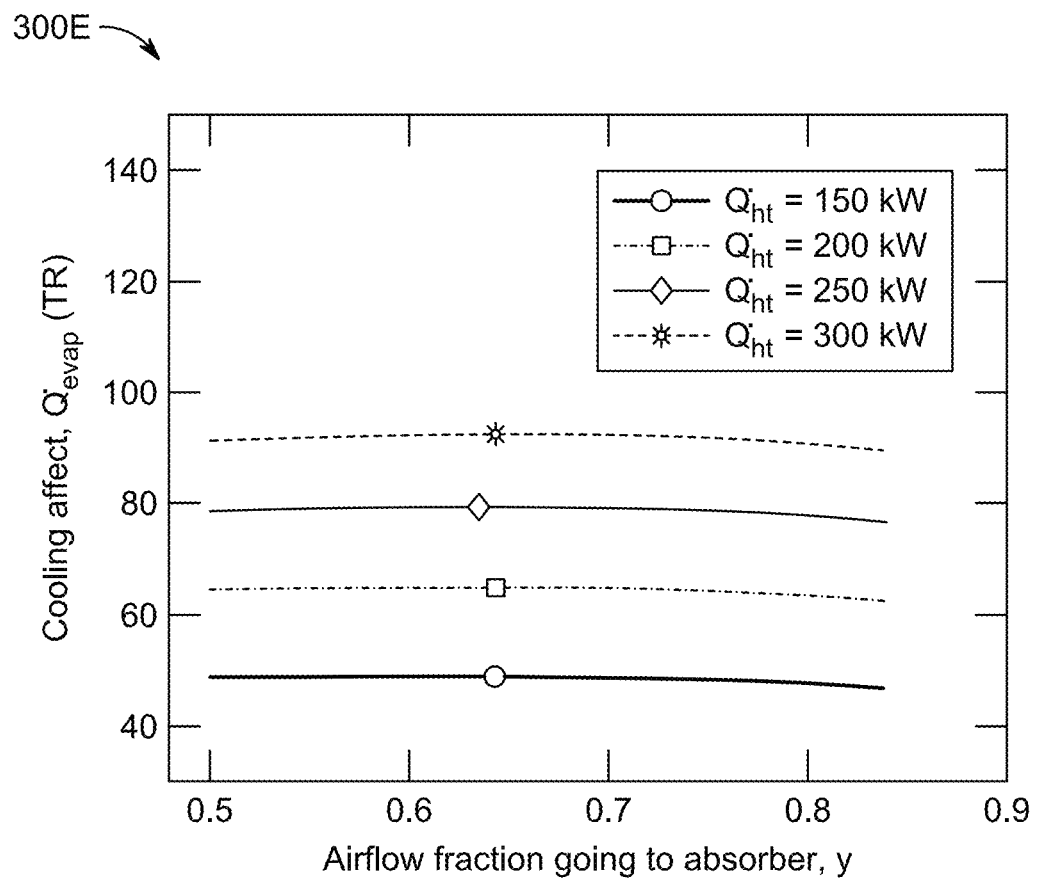
FIG. 3E illustrates a graph depicting a relationship between a fraction of airflow that cools the absorber and cooling capacity.

Referring to FIGS. 3A-3E, illustrated are graphical representations depicting effect of the fraction of airflow (first portion of the carrier gas) that cools the absorber 132 (as represented by 'y') on the coupled system 100 performance at different driving power values. Specifically, FIG. 3A illustrates a graph 300A depicting a relationship between the fraction of airflow 'y' that cools the absorber 132 and GOR; FIG. 3B illustrates a graph 300B depicting a relationship between the fraction of airflow 'y' that cools the absorber 132 and COP; FIG. 3C illustrates a graph 300C depicting a relationship between the fraction of airflow 'y' that cools the absorber 132 and EUF; FIG. 3D illustrates a graph 300D depicting a relationship between the fraction of airflow 'y' that cools the absorber 132 and water production (freshwater); and FIG. 3E illustrates a graph 300E depicting a relationship between the fraction of airflow 'y' that cools the absorber 132 and cooling capacity (cooling affect).

As discussed, because the operating conditions and energy released from the absorber 132 and the condenser 138 are different, the airflow from the HDH system 102 is split into two streams. The airflow fraction (first portion) going to cool the absorber 132 (and obtain some heat to help in driving the HDH system 102) is donated by 'y' while the rest '(1−y)' goes to the condenser. The effect of 'y' on the system performance at different driving power values is shown in FIGS. 3A-3E. It is seen that the increase in 'y' values may raise the performance indicators to the optima, and then they decrease. The increase in performance values when airflow fraction 'y' rises to about 0.63 is due to the higher energy required to be extracted from the absorber 132 than from the condenser 138. Also, the amount of solution (that releases heat) in the absorber 132 is more than water vapor condensed in the condenser 138 (the water vapor mass is part of the total solution mass in the absorber 132).

The decrease in performance values when y>0.63 is due to less effective cooling for the condenser 138 while inflated cooling is provided to the absorber 132. For such a trend, the optimal performance may be recommended at y=0.63 for all performance indices. Another point that may be noted from FIGS. 3A-3E is the effect of driving power (i.e., 150, 200, 250, and 300 kW). FIGS. 3A-3C show that the increase in driving power to 200 kW leads to the maximum values for GOR and EUF. More than 200 kW minimizes both GOR and EUF. That is because higher water production (as shown in FIG. 3D) is obtained but with an expense of larger energy consumption.

Further, as may be seen from FIGS. 3B and 3D, the COP has almost closer values for driving power of 150 and 200 kW, while higher driving power values >200 kW result in lower COP, regardless of the increase in the cooling capacity. It may be inferred that the wise utilization of energy may be selected for y=0.63 and $\dot{Q}_{ht}$=200 kW, which has GOR of 4.2, COP of 1.1, and EUF of 5.3, water production of 1244 L/h, and cooling effect of 64.9TR. On the other hand, the maximum produced water and cooling effect may be obtained at y=0.63 and $\dot{Q}_{ht}$=300 by about 1842 L/h and 92.4TR, respectively. At the maximum water and cooling effect productions, excellent performance is also obtained for GOR, COP, and EUF by a factor of 4.1, 1.1, 5.2, respectively, using the present system 100.

Mass Flow Rate Ratio of the Humidification-Dehumidification System

Figure 4A:
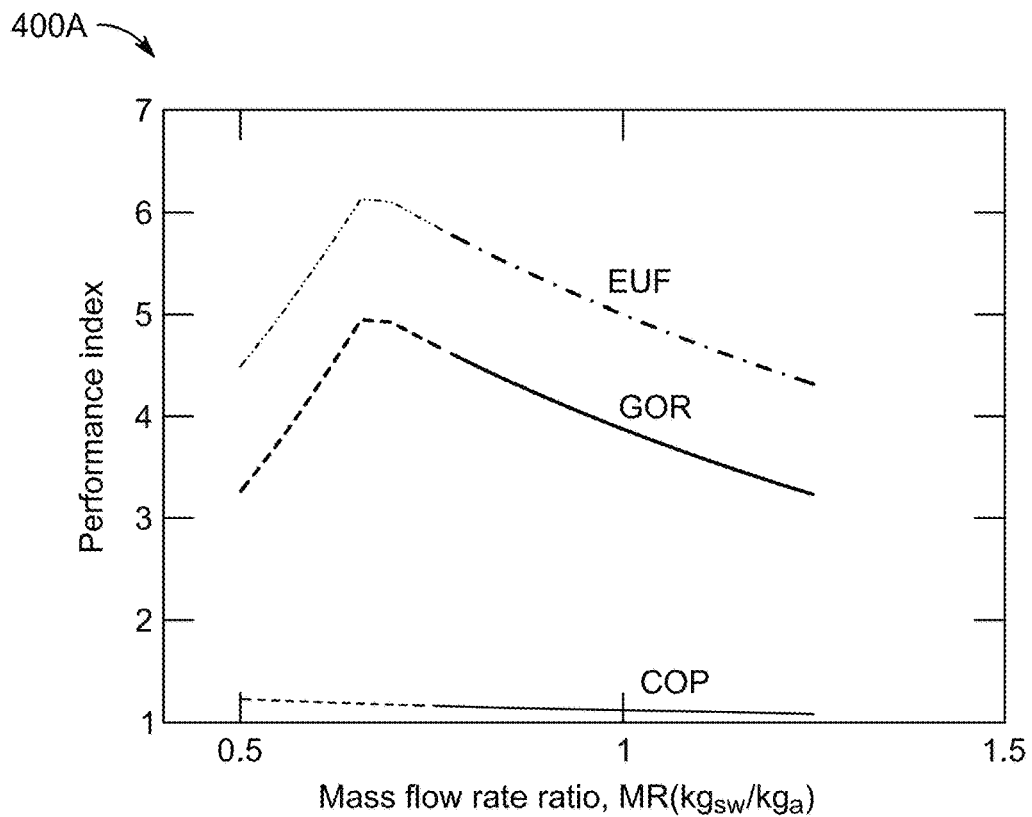
FIG. 4A illustrates a graph depicting relationships between GOR, COP and EUF, and MR.
Figure 4B:
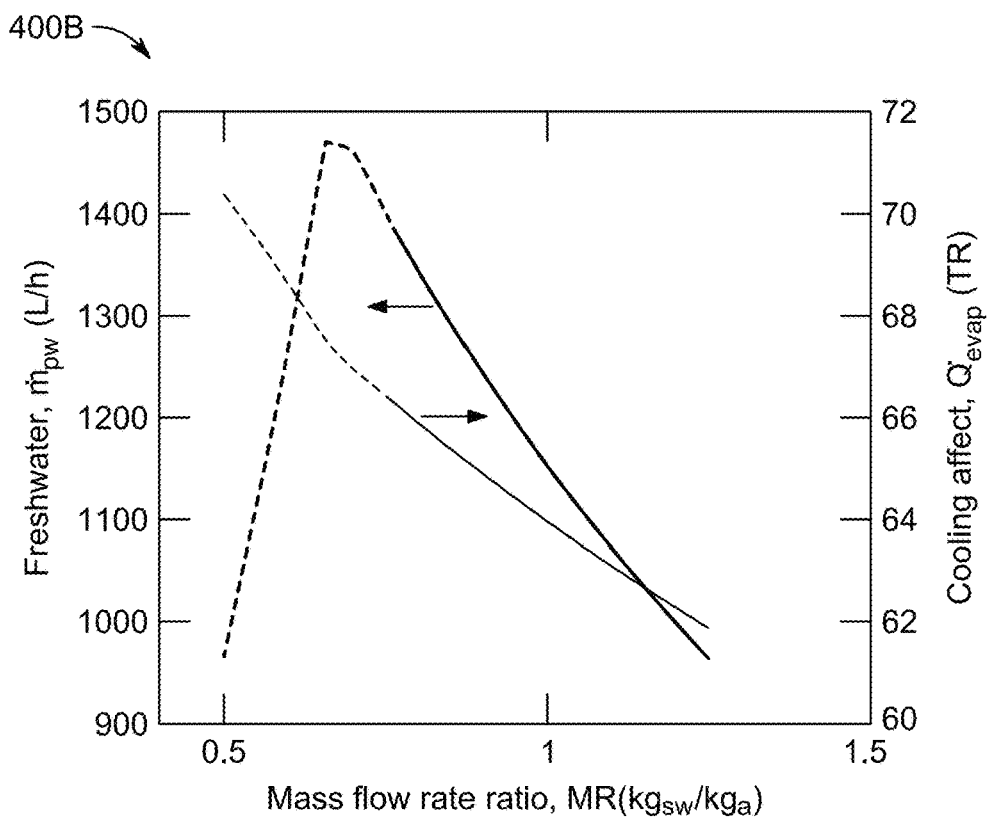
FIG. 4B illustrates a graph depicting relationships between water production and cooling effect, and MR.

Referring to FIGS. 4A-4B, illustrated are graphical representations depicting influence of HDH mass flow rate ratio (MR) on the coupled system 100 performance. Specifically, FIG. 4A illustrates a graph 400A depicting a relationships between GOR, COP and EUF, and MR; and FIG. 4B illustrates a graph 400B depicting a relationships between water production and cooling effect, and MR. It may be noted that one of the vital parameters influencing the performance of the HDH system 102 is mass flow rate ratio (MR). When MR=1, this implies the same mass flow rates of air and saline water are used in the HDH system 102, while higher values mean more saline water amounts. FIGS. 4A and 4B depict the effect of MR on the integrated system performance (i.e., GOR, COP, and EUF, as shown in FIG. 4A) and productivity (i.e., water production and cooling capacity, as shown in FIG. 4B). It should be noted that the input data of Table 2 is considered except for 'y' is taken at 0.63, as suggested above in reference to FIGS. 3A-3E. FIGS. 4A-4B show that there are optimal values for GOR, EUF, and water production, but unfortunately, they are located in the invalid results (dashed lines) that violate the second law of thermodynamics. After that, the valid results may be attained for MR>0.77 and thus the optimal performance are selected for MR=0.78 to be GOR=4.5, COP=1.2, EUF=5.6, water production=1326 L/h, and cooling capacity=65.7 TR.

Further increase in MR values (>0.78) decreases the system production and performance owing to minimizing the air flow rate amounts that decrease the absorber 132 and the condenser 138 cooling processes and simultaneously reduces the heat gained to power the HDH system 102. This is different from a water-heated HDH based system which showed optimal performance at MR=1.3 due to that higher water amounts are preferred to exchange heat between the HDH system 102 and the VAR system 104.

Solution Mass Flow Rate and Driving Power

Figure 5A:
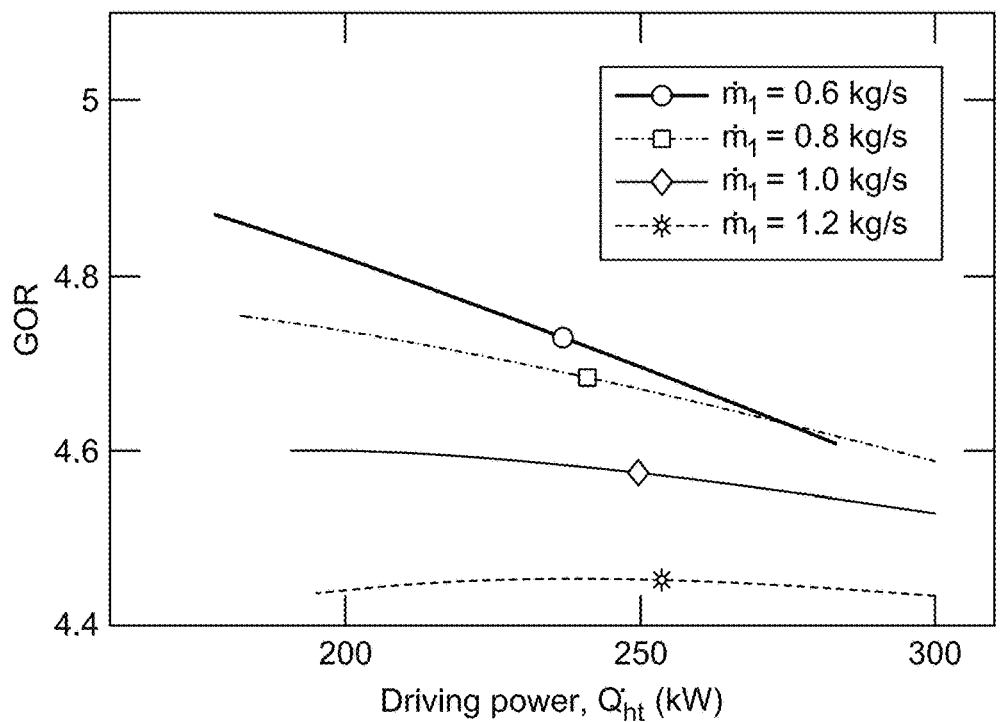
FIG. 5A illustrates a graph depicting a relationship between driving power and GOR.
Figure 5B:
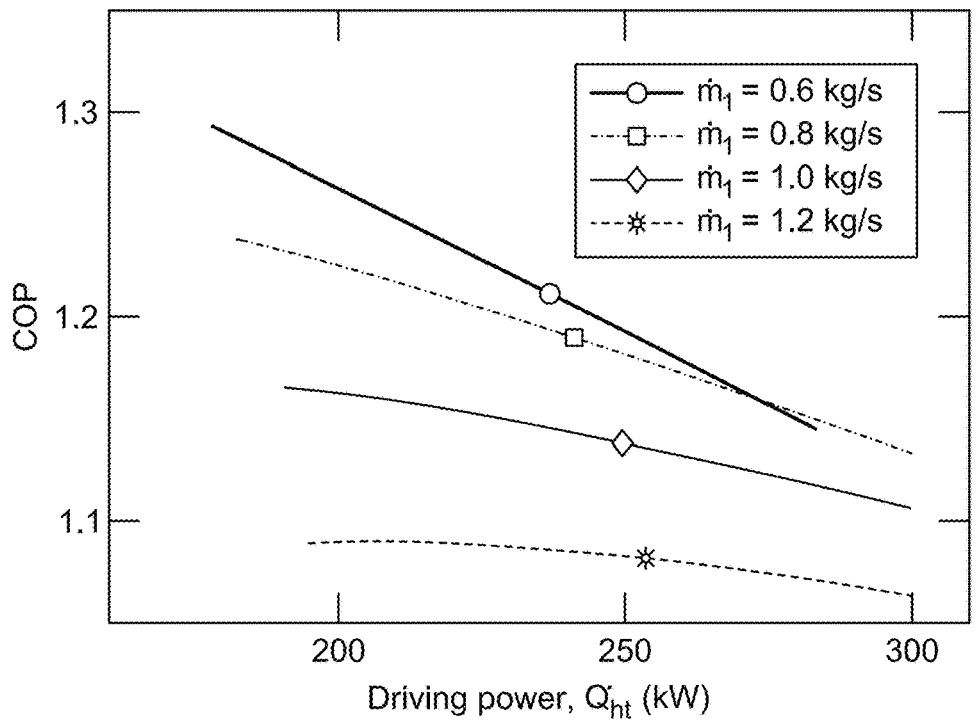
FIG. 5B illustrates a graph depicting a relationship between driving power and COP.
Figure 5C:
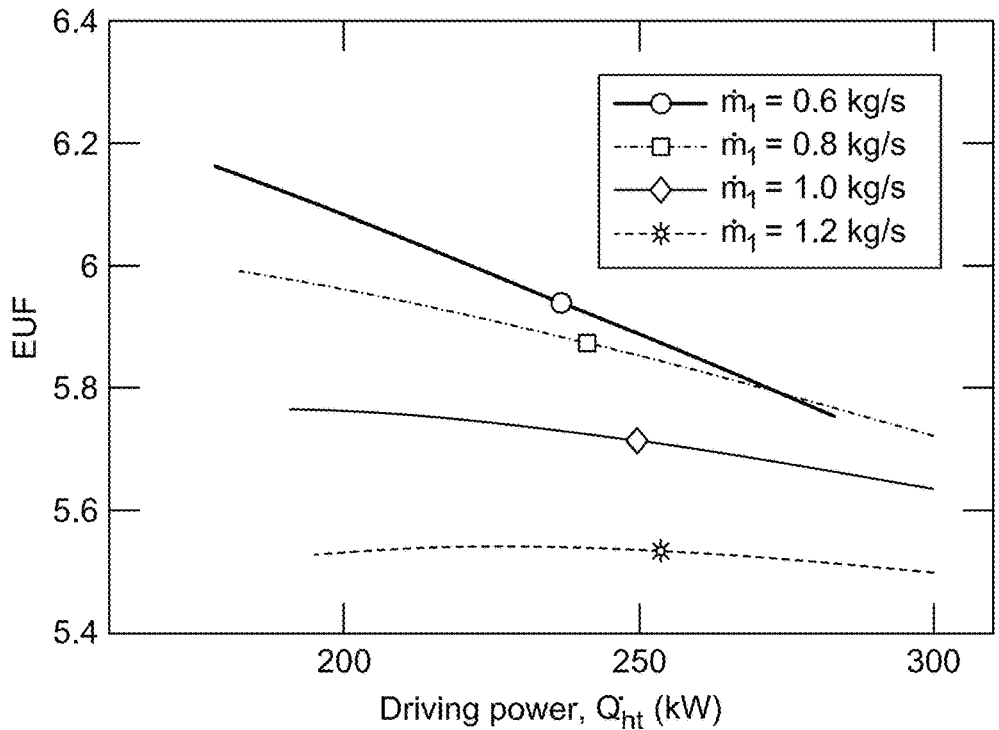
FIG. 5C illustrates a graph depicting a relationship between driving power and EUF.
Figure 5D:
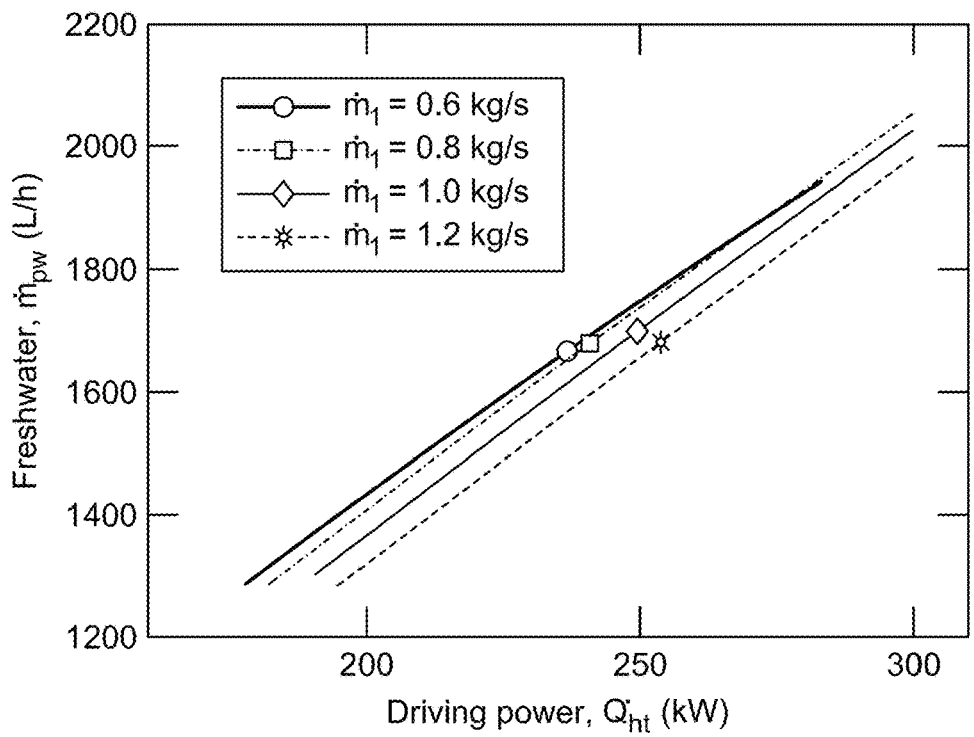
FIG. 5D illustrates a graph depicting a relationship between driving power and water production.
Figure 5E:
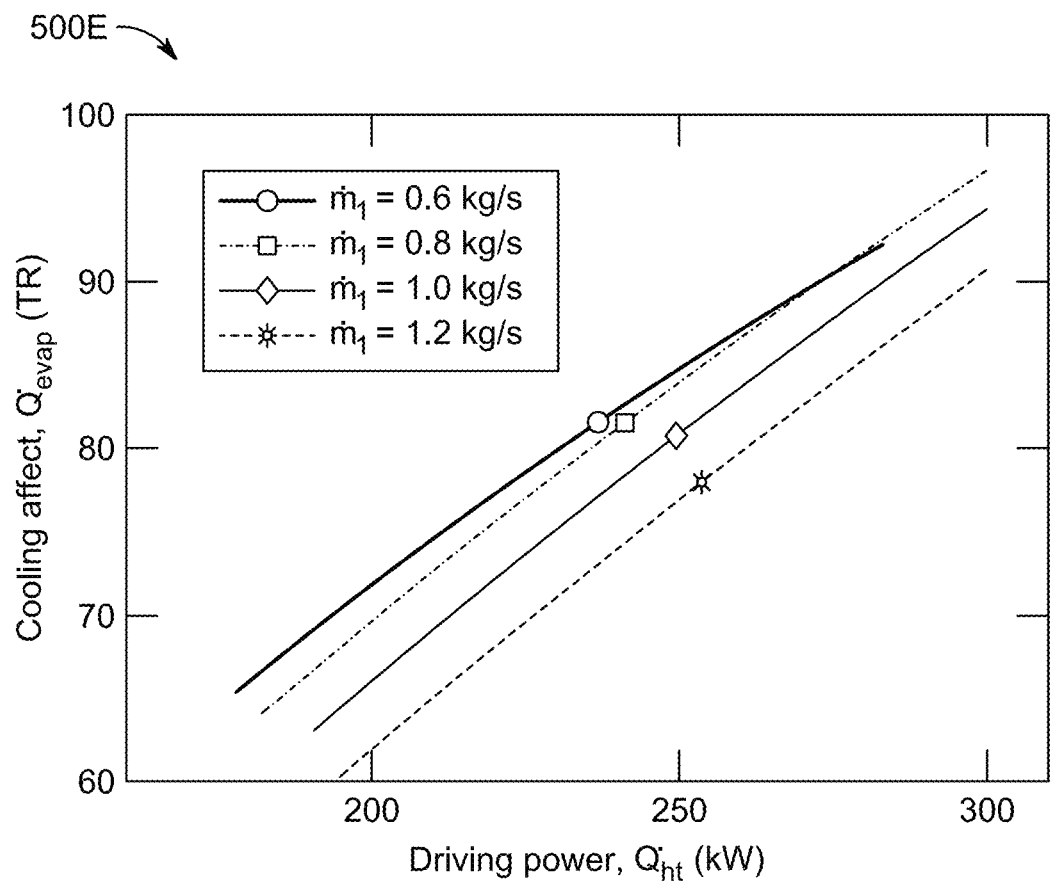
FIG. 5E illustrates a graph depicting a relationship between driving power and cooling capacity.

Referring to FIGS. 5A-5E, illustrated are graphical representations depicting the performance and productivity of the integrated system 100 against driving power at different weak-solution mass flow rates ($\dot{m}_1$=0.6, 0.8, 1.0, and 1.2 kg/s). Herein, the values of 'y' and MR are taken as 0.63 and 0.78, as discussed in reference to FIGS. 3A-3E and FIGS. 4A-4B, respectively. Specifically, FIG. 5A illustrates a graph 500A depicting a relationship between driving power and GOR; FIG. 5B illustrates a graph 500B depicting a relationship between driving power and COP; FIG. 5C illustrates a graph 500C depicting a relationship between driving power and EUF; FIG. 5D illustrates a graph 500D depicting a relationship between driving power and water production (freshwater); and FIG. 5E illustrates a graph 500E depicting a relationship between driving power and cooling capacity (cooling affect). To some extent, the effect of driving power is discussed in reference to FIGS. 3A-3E. However, because it directly heats the solution of the VAR system 104, the impact of both solution mass flow rate and driving power on the performance is appropriate to be discussed.

FIGS. 5A-5E demonstrate that when $\dot{Q}_{ht}$ is less than 275 kW, the lowest solution mass flow rate (0.61 kg/s) has higher values for all performance and productivity indicators. The lower solution amounts may lead to higher temperatures and then improve the water vapor amount leaving the desorbers 142, 144 to heat the air in the condenser 138. However, with higher heating power (>275 kW), the efficient system 100 is achieved at $\dot{m}_1$=0.8, which may produce more water vapor at a higher temperature to drive the HDH system 102.

In this regard, two sets of results may be favored. The first set is at $\dot{Q}_{ht}$=177.9 kW and $\overline{m}_1$=0.6 kg/s, in which the optimal performance indices (GOR, COP, and EUF) are in a factor of 4.9, 1.3 and 6.2, respectively, while lower water and cooling effect are produced by 1287 L/h and 55.4 TR, respectively. The second set is at $\dot{Q}_h$=300 kW and $\dot{m}_1$=0.8 kg/s, in which excellent GOR, COP, and EUF are found to be 4.6, 1.1, and 5.7, respectively, whereas the highest production of water and cooling effect are obtained by about 2053 L/h and 96.7TR, respectively. Comparing the results of the two sets, the system 100 may utilize the second set since good performance may be obtained with good water production.

As may be noted, FIGS. 5A-5C show a slight drop in GOR, COP, and EUF with the increase in the driving power values due to a little higher energy consumption than the products (water and cooling effect). However, it may be understood that the productivity always rises with the increase in the driving power due to raising the air temperatures in components of the VAR system 104 (the absorber 132 and the condenser 138). Another point that may be noted from FIGS. 5A-5E is that the results shown are only valid ones while those that violate the second law of thermodynamics are trimmed. For example, at $\dot{m}_1$=0.6, the valid results are only located along with the range of 177.9-283.2 kW.

Saline Water Mass Flow Rate

Figure 6A:
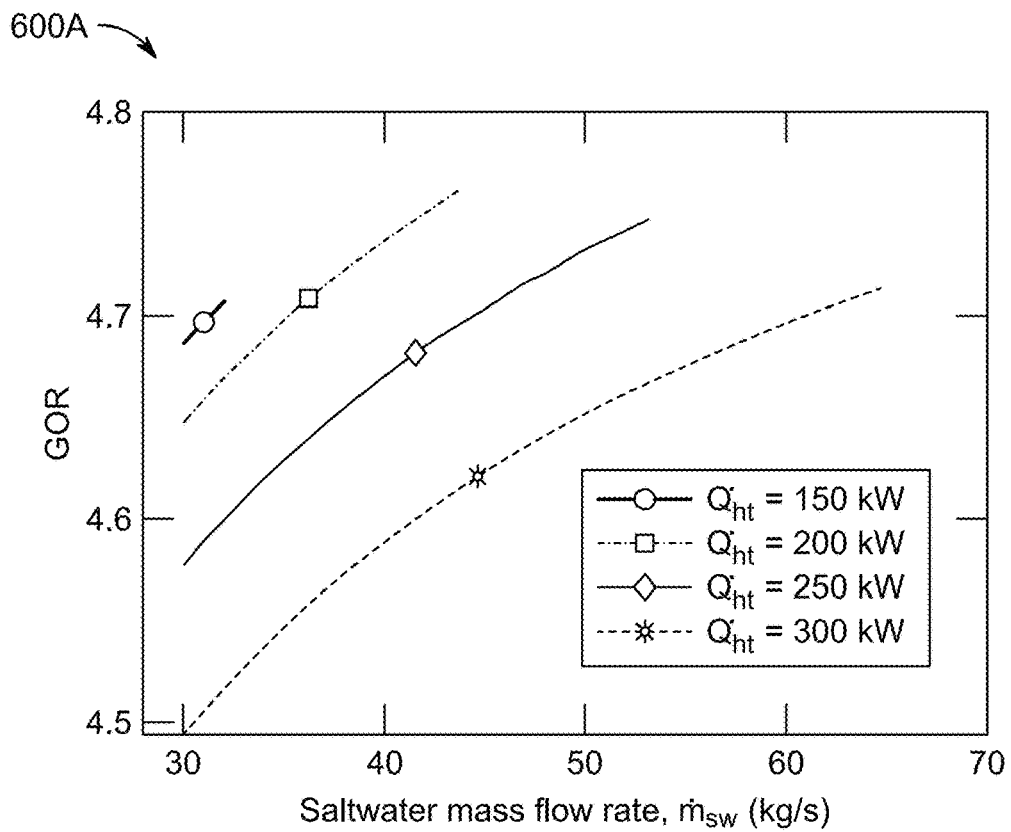
FIG. 6A illustrates a graph depicting a relationship between saltwater mass flow rate and GOR.
Figure 6B:
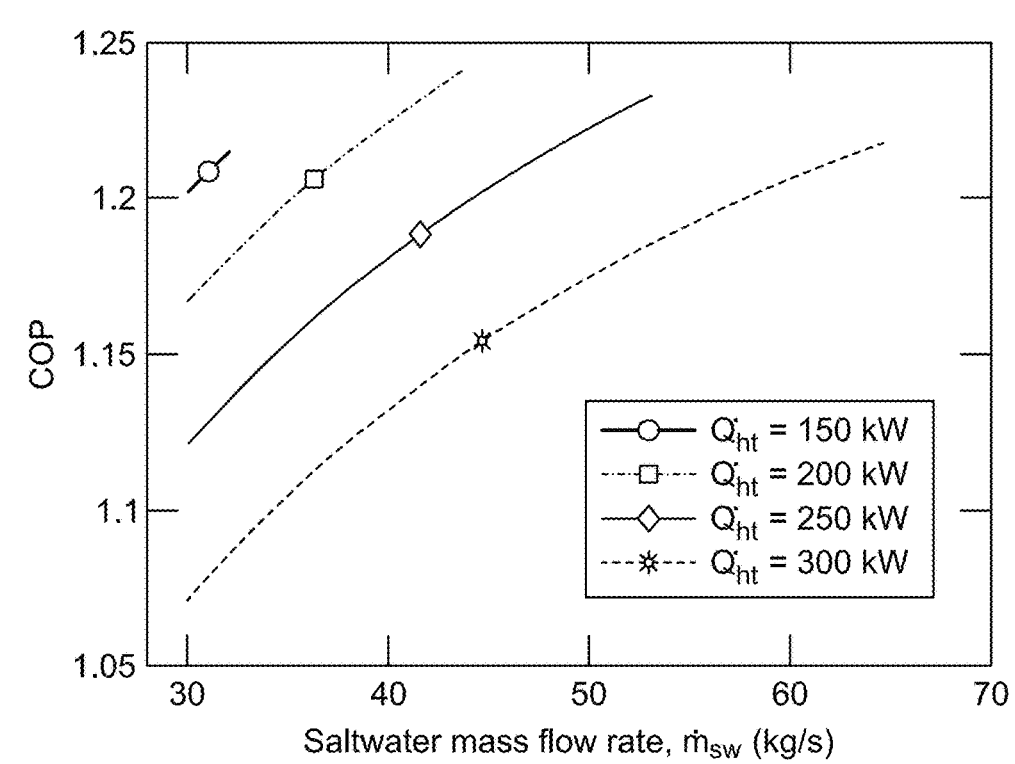
FIG. 6B illustrates a graph depicting a relationship between saltwater mass flow rate and COP.
Figure 6C:
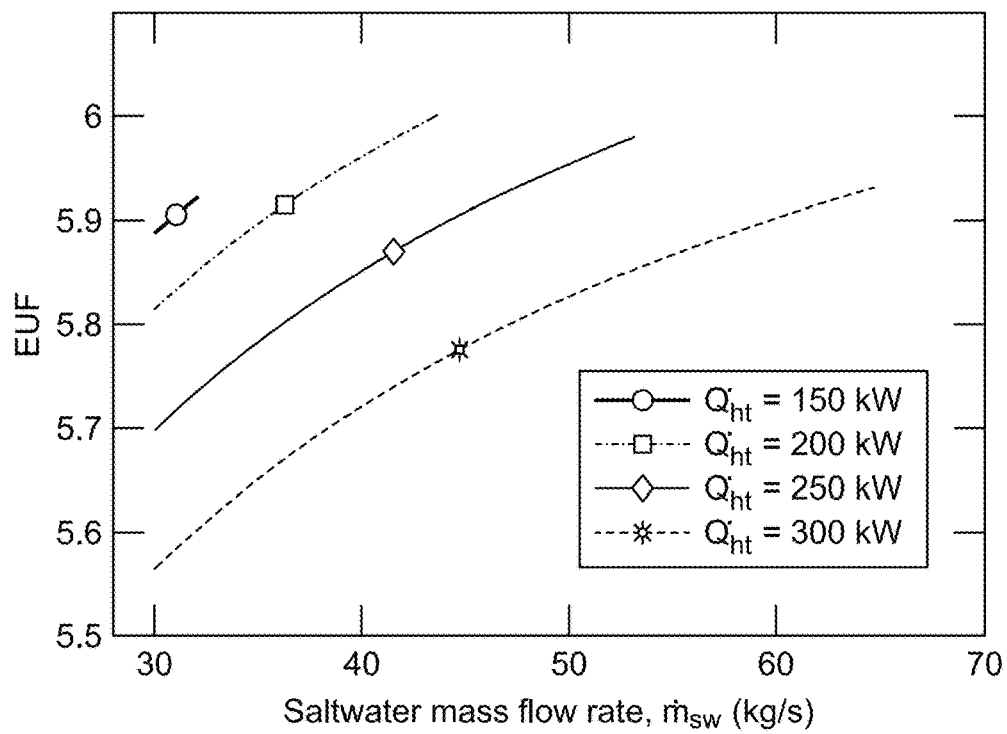
FIG. 6C illustrates a graph depicting a relationship between saltwater mass flow rate and EUF.
Figure 6D:
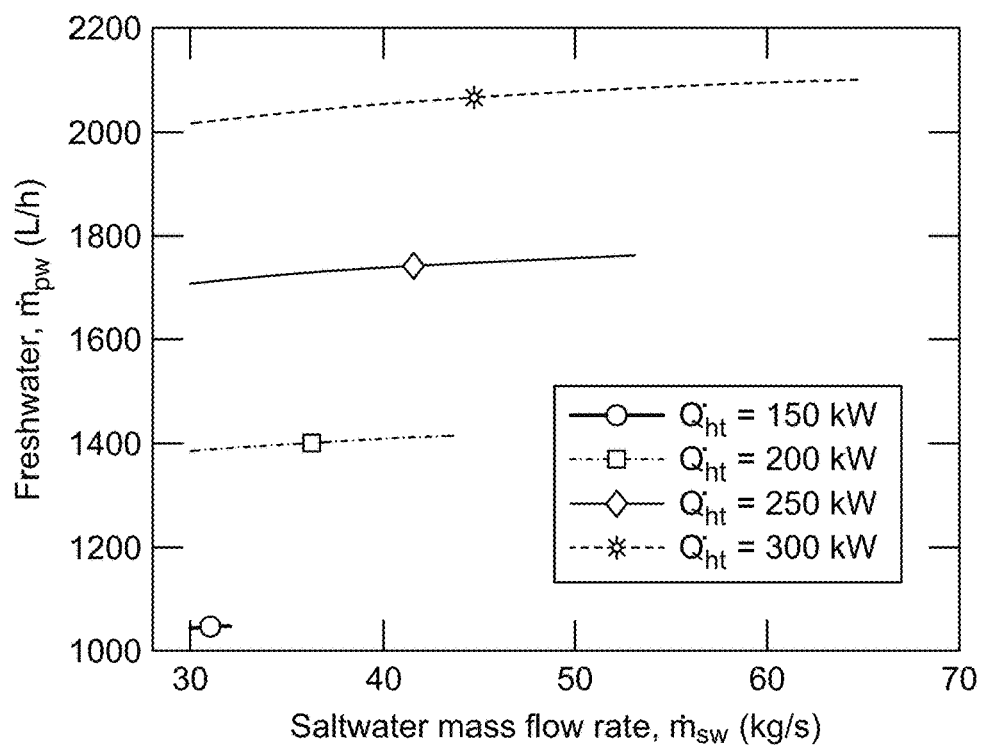
FIG. 6D illustrates a graph depicting a relationship between saltwater mass flow rate and water production.
Figure 6E:
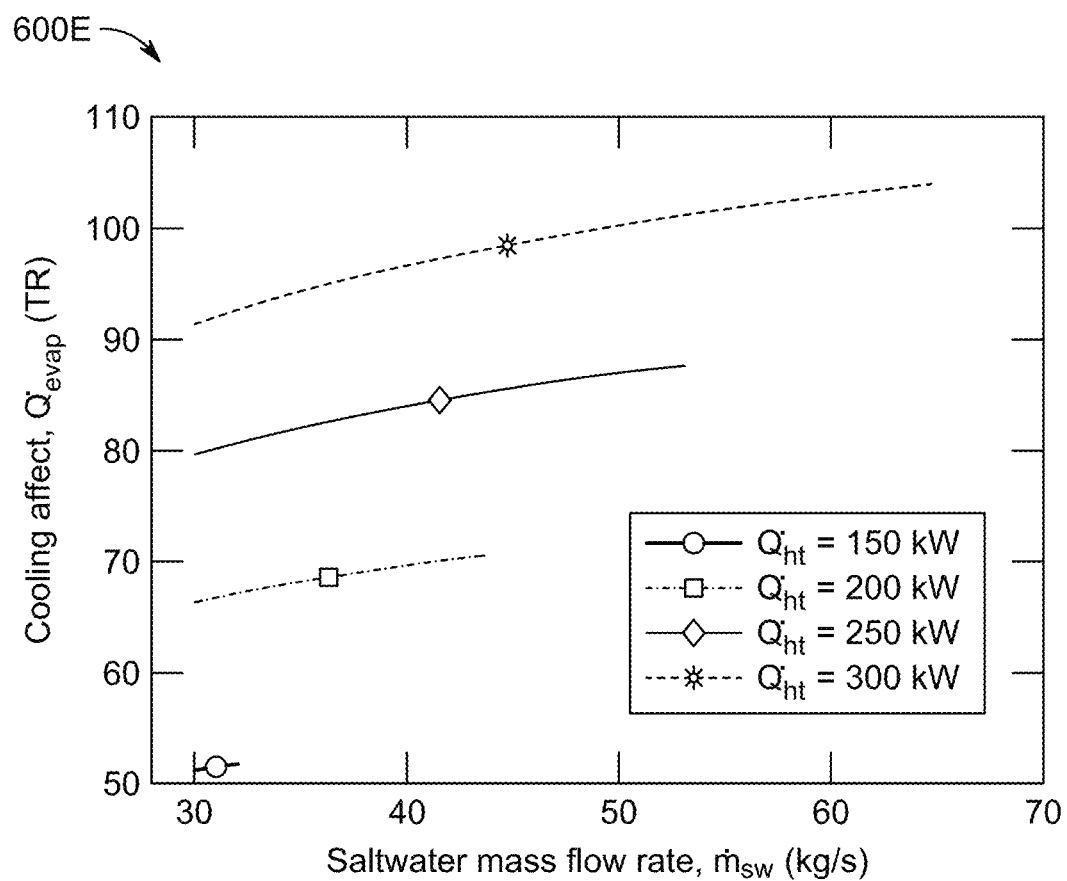
FIG. 6E illustrates a graph depicting a relationship between saltwater mass flow rate and cooling capacity.

Referring to FIGS. 6A-6E, illustrated are graphical representations depicting influence of saline water mass flow rate '$\dot{m}_{sw}$' on the system productivity and performance at different driving power values. Specifically, FIG. 6A illustrates a graph 600A depicting a relationship between saltwater mass flow rate and GOR; FIG. 6B illustrates a graph 600B depicting a relationship between saltwater mass flow rate and COP; FIG. 6C illustrates a graph 600C depicting a relationship between saltwater mass flow rate and EUF; FIG. 6D illustrates a graph 600D depicting a relationship between saltwater mass flow rate and water production (freshwater); and FIG. 6E illustrates a graph 600E depicting a relationship between saltwater mass flow rate and cooling capacity (cooling affect). In particular, for y=0.63, MR=0.78, and $\dot{m}_1$=0.8, the effect of saline water mass flow rate on the performance and productivity at different driving power values is discussed. The other parametric values are those listed in Table 2. It may be noticed from FIGS. 6A-6E that the valid performance and productivity results are widespread for higher driving power. For example, at $\dot{Q}_{ht}$=150 kW, the system 100 may practically work only at saline water amounts of 30-32 kg/s. Nonetheless, at $\dot{Q}_h$=300 kW, the system 100 works for $\dot{m}_{sw}$=30-65 kg/s.

Generally, the increase in HDH saline water amounts improves the system 100 performance and productivity. That is because more water is used to condensate the air humidity in the dehumidifier 114. Also, the water vapor generated in the humidifier 112 increases due to the rise in heat and mass exchanges between the air and saline water. Then, the humid air is cooled by a larger amount of saline water, which in turn effectively cools the absorber 132 and the condenser 138. As a result, the performance of both the HDH system 102 and the VAR system 104 is improved at a higher $\dot{m}_{sw}$.

It may also be observed from FIGS. 6A-6E that there are two sets of results that may be selected based on either performance or productivity. The optimal performance values may be obtained at $\dot{m}_{sw}$=45 kg/s and $\dot{Q}_{ht}$=200 kW by 4.8 for GOR, 1.2 for COP, and 6.0 for EUF. Simultaneously, the water production and cooling capacity may be found to be 1414 L/h and 70.6 TR, respectively. The second set may be selected based on the maximum productivity at $\dot{m}_{sw}$=65 kg/s and $\dot{Q}_{ht}$=300 kW. The water production and cooling capacity may be found to be 2100 L/h and 104TR, respectively. These results are achieved at excellent performance closer to the optimum values with GOR of 4.7, COP of 1.2, and EUF of 5.9. Thus, the second set of results is preferred to represent the performance of the proposed integrated system 100 and compare it with that of the water-heated HDH system and others reported in the literature, as discussed in the next section.

Comparison of Cost and Productivity

The results discussed above demonstrate that at the implemented input conditions (i.e., y=0.63, MR=0.78, $\dot{m}_1$=0.8, $\dot{Q}$ht=300 kW, $\varepsilon_h$=0.85, $\varepsilon_d$=0.85, $T_{23}$=25° C., $T_{21}$=12° C., $T_{22}$=7° C., and S=35 g/kg), the system 100 may produce 2100.5 L/h freshwater, 104.0TR cooling effect at a performance in a factor of 4.7 for GOR, 1.2 for COP, and 5.9 for EUF. Based on the economic analysis (as discussed above), the water production cost is estimated to be 2.5$/m$^3$, and the cooling effect cost is 0.0037$/kWh. These cost and performance data confirm that the present VAR system 104 driven air-heated HDH system 102 (i.e., the system 100) is a promising candidate for decentralized water and cooling productions. Compared with the performance of the reported systems in the literature (Table 4 below), the present system 100 shows good productivity and economic performance.

TABLE 4

Performance of known integrated humidification-dehumidification desalination systems with various refrigeration system types.

| Integrated system | Powering connection | GOR (water production, kg/h) | COP (Cooling load, TR) | Water cost, $/m$^3$ | Reference |
| --- | --- | --- | --- | --- | --- |
| VAR-HDH | Air- and water-heated HDH by the condenser of VAR. | 8.88 (for air-heated) and 7.63 (water-heated) | — | 7.75-34.38 | D. Lawal, M. Antar, A. Khalifa, S. Zubair, F. Al-Sulaiman, Humidification-dehumidification desalination system operated by a heat pump, Energy Convers Manag 161 (2018) 128-140. |
|  | Water-heated HDH by the condenser of VAR. | 5.14 (82.12) | — | — | W.F. He, D. Han, C. Ji, Investigation on humidification dehumidification desalination system coupled with heat pump, Desalination 436 (2018) 152-160. |
|  | Water-heated HDH by the condenser of VAR. | 5.28 (71.56) | 3.83 | 18 | W.F. He, T. Wen, D. Han, L.T. Luo, R.Y. Li, W.C. Zhong, Energetic, entropic and economic analysis of a heat pump coupled humidification dehumidification desalination system using a packed bed dehumidifier, Energy Convers. Manag. 194 (2019) 11-21. |

TABLE 4-continued

Performance of known integrated humidification-dehumidification desalination systems with various refrigeration system types.

| Integrated system | Powering connection | GOR (water production, kg/h) | COP (Cooling load, TR) | Water cost, $/m³ | Reference |
|---|---|---|---|---|---|
| | Water-heated HDH by the condenser of VAR | 8.12 (150.75) | — | 16 | W. He, H. Yang, D. Han, Thermodynamic investigation and optimization of a heat pump coupled open-air, open-water humidification dehumidification desalination system with a direct contact dehumidifier, Desalination 469 (2019) 114101. |
| | Water-heated HDH by the condenser of VAR and solar collector. | 2.42 (20.54) | — | — | H. Xu, Y.J. Dai, Parameter analysis and optimization of a two-stage solar assisted heat pump desalination system based on humidification-dehumidification process, Sol. Energy 187 (2019) 185-198. |
| | Water-heated HDH by the condenser of VAR through a plate heat exchanger. | 2.05 (22.26) | — | 51 | Y. Zhang, C. Zhu, H. Zhang, W. Zheng, S. You, Y. Zhen, Experimental study of a humidification-dehumidification desalination system with heat pump unit, Desalination 442 (2018) 108-117. |
| | Water-heated HDH by the condenser of VAR through a plate heat exchanger. | 2.53 (42.55) | — | 24.1 | Y. Zhang, H. Zhang, W. Zheng, S. You, Y. Wang, Numerical investigation of a humidification-dehumidification desalination system driven by heat pump, Energy Convers Manag 180 (2019) 641-653. |
| | Water-heated HDH by an electric heater, while HDH was coupled with the VAR evaporator. | 1.5 (1.83) | — | 4.68 | E. Ayati, Z. Rahimi-Ahar, M.S. Hatamipour, Y. Ghalavand, Water productivity enhancement in variable pressure humidification dehumidification (HDH) desalination systems using heat pump, Appl. Therm. Eng. 160 (2019) 114114. |
| | Water-heated HDH by spreading water over the condenser, while the evaporator acted as a dehumidifier. | 6.1 (7.35) | <2.2 | 9.6 | B. Anand, S. Murugavelh, Performance analysis of a novel augmented desalination and cooling system using modified vapor compression refrigeration integrated with humidification-dehumidification desalination, J. Clean Prod. 255 (2020), 120224. |
| | Water-heated HDH by the condenser of VAR. | 4.07 (11.99) | (0.873) | >10.68 | D.U. Lawal, M.A. Antar, A. Khalifa, S.M. Zubair, F. Al-Sulaiman, Experimental investigation of heat pump driven humidification-dehumidification desalination system for water desalination and space conditioning, Desalination 475 (2020), 114199. |

TABLE 4-continued

Performance of known integrated humidification-dehumidification desalination systems with various refrigeration system types.

| Integrated system | Powering connection | GOR (water production, kg/h) | COP (Cooling load, TR) | Water cost, $/m$^3$ | Reference |
|---|---|---|---|---|---|
| VAR-HDH | Water-heated HDH by the absorber and condenser of VAR. | (2.42 per kW) | — | (2.42 per | D.B. Boman, S. Garimella, Performance improvement of a water-purifying absorption cooler through humidification-dehumidification, Appl. Therm. Eng. 185 (2021), 116327. |
| | Solar water-heated HDH while VAR evaporator acted as a dehumidifier. Water-heated two-stage HDH with a solar-powered VAR. Solar water-heated HDH | (6.75) | (21.3 TR) | — | C. Chiranjeevi, T. Srinivas, Combined two stage desalination and cooling plant, Desalination 345 (2014) 56-63. |
| | Solar water-heated HDH while VAR evaporator acted as a dehumidifier. Water-heated two-stage HDH with a solar-powered VAR. Solar water-heated HDH | (1.5) | (0.075) | — | C. Chiranjeevi, T. Srinivas, Experimental and simulation studies on two stage humidification-dehumidification desalination and cooling plant, Desalination 376 (2015) 9-16. |
| | Solar water-heated HDH while chilled water was used for humid air condensation. | (50) | (1) | — | C. Chiranjeevi, T. Srinivas, Augmented desalination with cooling integration, Int. J. Refrig. 80 (2017) 106-119. |
| | Water heated HDH by the condenser of VAR. Electric compressor drove the VAR system. | 9.02 (2329) | — | 7130 | H. Rostamzadeh, A.S. Namin, H. Ghaebi, M. Amidpour, Performance assessment and optimization of a humidification dehumidification (HDH) system driven by absorption-compression heat pump cycle, Desalination 447 (2018) 84-101. |
| | Water heated HDH by the condenser and absorber of VAR. | 4.54 (1145) | 1.29 (62.5) | 2.89 | N.A.A. Qasem, S.M. Zubair, A.M. Abdallah, M.H. Elbassoussi, M.A. Ahmed, Novel and efficient integration of a humidification-dehumidification desalination system with an absorption refrigeration system, Appl. Energy 263 (2020) 114659. |
| | Water heated HDH by the condenser and absorber of VAR (zero extraction HDH single effect VAR). | 2.32 (34.6) | 0.5 | 5.8 | M.H. Elbassoussi, M.A. Ahmed, S.M. Zubair, N.A.A. Qasem, On a thermodynamically-balanced humidification-dehumidification desalination system driven by a vapor-absorption heat pump, Energy Convers. Manag. 238 (2021), 114142. |
| VAD-HDH | Air-heated HDH by the condenser of VAD. | 7.5 (>22) | >0.45 | 6.5 | N.A.A. Qasem, S.M. Zubair, Performance evaluation of a novel hybrid humidification-dehumidification (air-heated) system with an adsorption desalination system, Desalination 461 (2019) 37-54. |

TABLE 4-continued

Performance of known integrated humidification-dehumidification desalination systems with various refrigeration system types.

| Integrated system | Powering connection | GOR (water production, kg/h) | COP (Cooling load, TR) | Water cost, $/m³ | Reference |
|---|---|---|---|---|---|
| | Water-heated HDH by the condenser of VAD. | 2.5 (21.75) | 0.46 (0.719) | 11.5 | M.H. Elbassoussi, R.H. Mohammed, S.M. Zubair, Thermoeconomic assessment of an adsorption cooling/desalination cycle coupled with a water-heated humidification-dehumidification desalination unit, Energy Convers. Manag. 223 (2020), 113270. |
| | Water-heated HDH by the adsorption bed of VAD. Also, VAD was connected with two ejectors to improve water production. | 2.75 (275.9) | — | 0.48 | E.S. Ali, R.H. Mohammed, N.A.A. Qasem, S.M. Zubair, A. Askalany, Solar-powered ejector-based adsorption desalination system integrated with a humidification-dehumidification system, Energy Convers. Manag. 238 (2021), 114113. |

It is evident from Table 4 that water-heated HDH is plentily used to heat the HDH water stream in the condenser of VAR, VAR, and VAD systems. Using air-heated HDH driven by a refrigeration system was not investigated much, but they showed better performance. For example, air-heated and water-heated VAR-HDH systems were compared to have a gained output ratio (COR) of 8.88 and 7.63, respectively [See: D. Lawal, M. Antar, A. Khalifa, S. Zubair, F. Al-Sulaiman, Humidification-dehumidification desalination system operated by a heat pump, Energy Convers Manag 161 (2018) 128-140]. Another study considered air-heated HDH was an integration with a VAD system [See: N. A. A. Qasem, S. M. Zubair, Performance evaluation of a novel hybrid humidification-dehumidification (air-heated) system with an adsorption desalination system, Desalination 461 (2019) 37-54]. Compared to water-heated HDH-VAD (which showed GOR of 2.5 and water cost of 11.5$/m³ [See: M. H. Elbassoussi, R. H. Mohammed, S. M. Zubair, Thermoeconomic assessment of an adsorption cooling/desalination cycle coupled with a water-heated humidification-dehumidification desalination unit, Energy Convers. Manag. 223 (2020), 113270], the air-heated coupled system showed a higher GOR by 7.5 and a lower water cost by 6.5$/m³ [See: N. A. A. Qasem, S. M. Zubair, Performance evaluation of a novel hybrid humidification-dehumidification (air-heated) system with an adsorption desalination system, Desalination 461 (2019) 37-54]. For the VAR-HDH system, all the investigated systems were water-heated based. For this point and because VAR-HDH could produce high freshwater quantities than other integrations [See: H. Rostamzadeh, A. S. Namin, H. Ghaebi, M. Amidpour, Performance assessment and optimization of a humidification dehumidification (HDH) system driven by absorption-compression heat pump cycle, Desalination 447 (2018) 84-101 and M. H. Sharqawy, M. A. Antar, S. M. Zubair, A. M. Elbashir, Optimum thermal design of humidification dehumidification desalination systems, Desalination 349 (2014) 10-21], the present disclosure provides the air-heated VAR-HDH system 100. It was also proved that standalone air-heated HDH systems have better performance than water-heated ones [See: M. H. Sharqawy, M. A. Antar, S. M. Zubair, A. M. Elbashir, Optimum thermal design of humidification dehumidification desalination systems, Desalination 349 (2014) 10-21 and N. Qasem, B. Imteyaz, M. A. Antar, Investigation of the effect of the top and the bottom temperatures on the performance of humidification dehumidification desalination systems, ASME Int. Mech. Eng. Congr. Expo. Proc. vol (2016) 6A-2016].

Further, for the same input power and optimal operating parameters, the energy and economic performance of standalone air-heated HDH and standalone DE-VAR systems are compared to those of the integrated system 100, as summarized in Table 5 below. Compared to the standalone HDH system, the integrated system 100 offers much better performance and freshwater cost by about 2.4 times for GOR, 3.0 times for EUF, 2.3 times for water production, and 2.4 times for water cost reduction. Despite the fact that the present system 100 has a little lower cooling capacity and COP than those of the standalone DE-VAR system by about 10.0%, it offers a significant reduction in cooling effect cost by 3.8 times and an exceptional enhancement in EUR by 4.2 times. Based on the above assessment, the present DE-VAR system 104 powered air-heated HDH system 102 is recommended for efficient performance and lower cost for both cooling and water production.

TABLE 5

Performance comparison of the integrated system, standalone HDH system, and standalone ED-VAR system

| Indicator | Proposed coupled system | Standalone air-heated HDH | DE-VAR system | Improvement times over HDH system | Improvement times over standalone DE-VAR system |
|---|---|---|---|---|---|
| GOR | 4.7 | 2.0 | — | 2.4 | — |
| COP | 1.2 | — | 1.4 | — | 0.9 |
| EUF | 5.9 | 2.0 | 1.4 | 3.0 | 4.2 |
| Freshwater production (L/h) | 2100.5 | 894.1 | — | 2.3 | — |
| Cooling capacity (TR) | 104.0 | — | 113.1 | — | 0.9 |
| Freshwater cost ($/m$^3$) | 2.5 | 6.1 | — | 2.4 | — |
| Cooling effect cost ($/kWh) | 0.0037 | — | 0.014 | — | 3.8 |

Saltwater Salinity

Figure 7A:
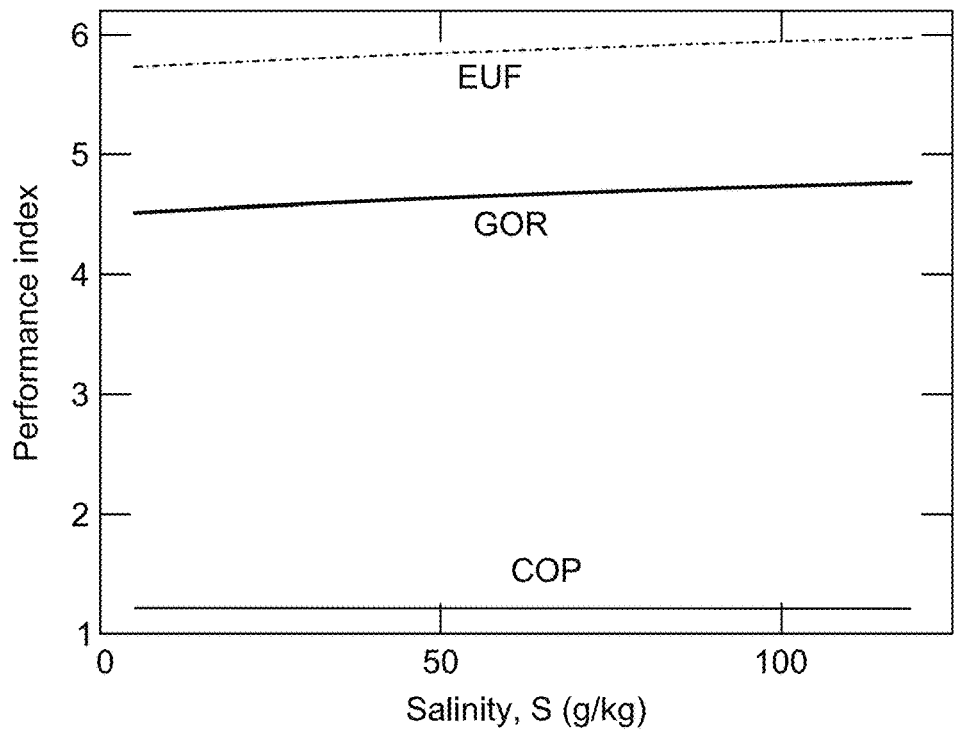
FIG. 7A illustrates a graph depicting a relationship between GOR, COP and EUF, and HDH salinity.
Figure 7B:
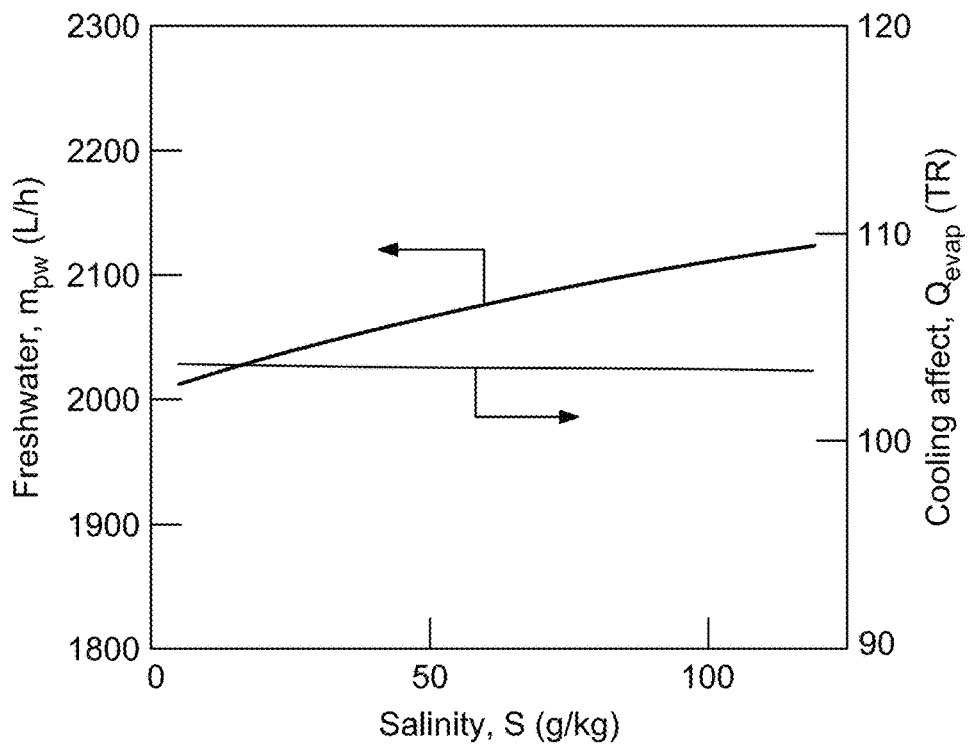
FIG. 7B illustrates a graph depicting a relationship between water production and cooling effect, and HDH salinity.
Figure 7C:
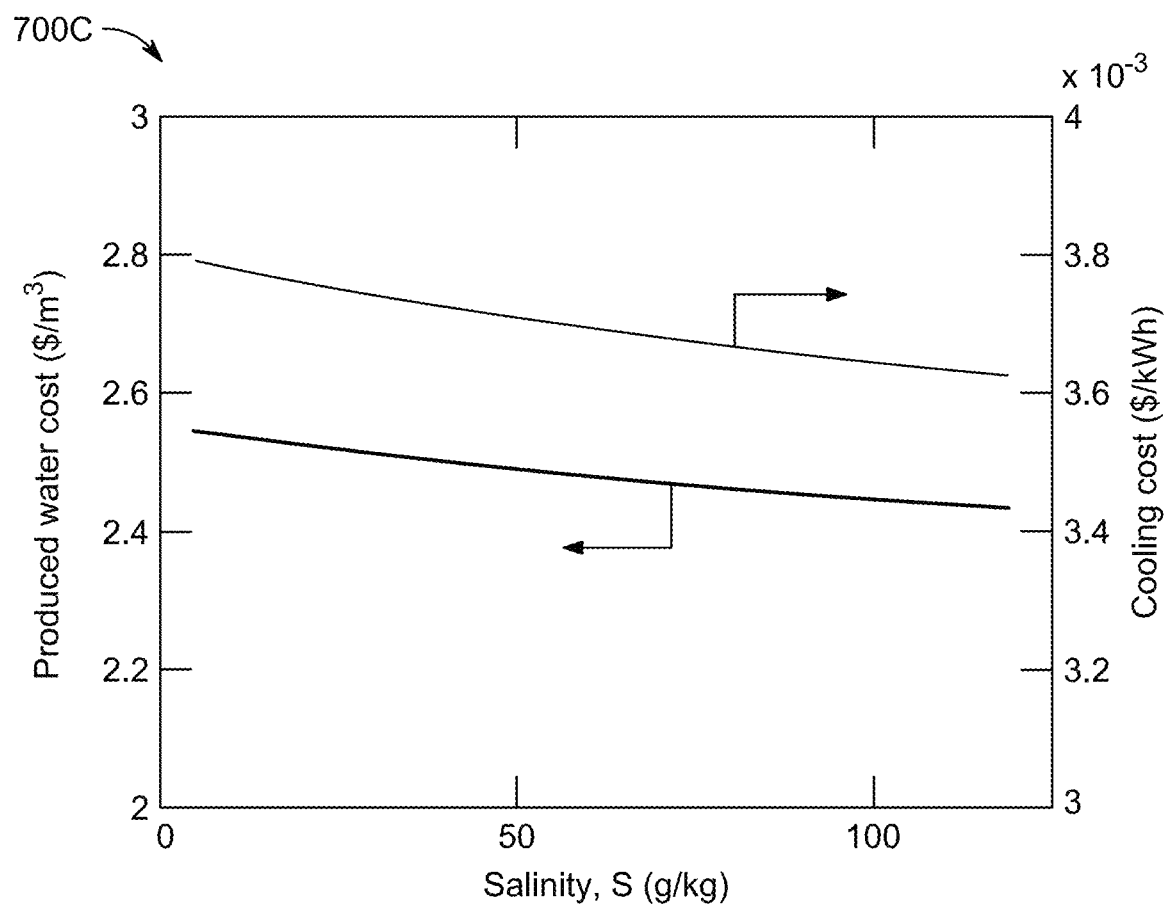
FIG. 7C illustrates a graph depicting a relationship between cost of water produced and cooling effect, and HDH salinity.

Referring to FIGS. 7A-7E, illustrated are graphical representations depicting influence of HDH salinity on the coupled system performance and productivity. Specifically, FIG. 7A illustrates a graph 700A depicting a relationship between GOR, COP and EUF, and HDH salinity; FIG. 7B illustrates a graph 700B depicting a relationship between water production and cooling effect, and HDH salinity; FIG. 7C illustrates a graph 700C depicting a relationship between cost of water produced and cooling effect, and HDH salinity. Thereby, the performance of the present system 100 may be confirmed for different salt concentrations. This is because the air-heated HDH system 102 is not expected to cause corrosive issues to the VAR system 104 components (as they are cooled by airflow streams). Therefore, the effect of salinity on the system 100 performance is investigated at y=0.63, MR=0.81, $\dot{m}_1$=0.8, $\dot{Q}_h$<=300 kW, $\varepsilon_h$=0.85, $\varepsilon_d$=0.85, $T_{23}$=25° C., $\dot{m}_{23}$=65 kg/s, $T_{21}$=12° C., $T_{22}$=7° C., and S=5-120 g/kg. It should be noted that the maximum investigated salinity is about 120 g/kg due to the limitation of saline water properties in EES software (as discussed). Also, the MR value used here is 0.81 instead of 0.78 to avoid the appearance of invalid results for some salinities.

Notably, the increase in salinity improves the performance indices (GOR, COP, and EUF, as shown in FIG. 7A), water produced and cooling effect (as shown in FIG. 7B), and water and cooling costs (as shown in FIG. 7C). The increments in HDH performance are better than that for the cooling effect because saline water treatment occurs in the HDH system 102. Also, the enhanced trends of increased salinity are due to the better thermal conductivity of saline water when the salt concentration is higher [See: M. M. Generous, N. A. A. Qasem, B. A. Qureshi, S. M. Zubair, A comprehensive review of saline water correlations and data-Part I: Thermodynamic properties, Arab J Sci Eng 45 (11) (2020) 8817-8876, incorporated herein by reference in its entirety]. For this reason, the heat exchange between saline water and humid air in the dehumidifier 114 and the heat and mass exchanges between air and saline water in the humidifier 112 are better for larger salinity.

Because of little higher performance and productivity at higher salinity, the cost of water production and cooling effect is also reduced, as shown in FIG. 7B. For S=120 g/kg, the integrated system 100 performance is found to be 4.7 for GOR, 1.2 for COP, 6.0 for EUF, 2112.0 L/h for water production, 103.5TR for cooling effect, 2.5$/m$^3$ for water cost, and 0.0036$/kWh for cooling cost. As may be seen, the difference in performance at different salinities is not much. Still, it provides a strong indication of the capability of the present system 100 to treat different saline water types.

Fresh water and comfortable indoor conditions are two of the most existing global issues, particularly in hot and arid contourites. The present disclosure may help tackle such problems by providing the system 100 and the method 200 for concurrent cooling and desalination to produce a daily freshwater of 50.4 m$^3$ and a cooling capacity of about 104 tons of refrigeration (~365.8 kW). The present integrated system 100 includes the double-effect vapor-absorption refrigerator (i.e., the DE-VAR system 104) and an air-heated humidification-dehumidification system (i.e., the HDH system 102). Despite the fact that double-effect absorption refrigerator was reported in the literature to be integrated with the water-heated humidification-dehumidification system, the system 100 of the present disclosure provides a lot of advantages, such as higher water production, higher gained output ratio (GOR), higher cooling load, and lower products cost.

A proper amount of air is determined to leave the humidifier 112 to satisfactorily cool the absorber 132 and the condenser 138 of the VAR system 104 while obtaining sufficient heat for producing good amounts of freshwater. In such a way, the present system 100 is expected to be less corrosive than known water-heated systems. The key operating parameters are investigated to obtain efficient performance (i.e., mass flow rate of saline water=65 kg/s, fraction of air going to absorber=0.63, mass flow rate of weak lithium bromide solution=0.81, thermal input power=300 kW, and air to water mass flow rate ratio=0.78).

The present system 100 performs better than standalone humidification-dehumidification and absorption refrigeration systems and can treat different saline water sources, even with high salinities, unlike other desalination systems such as reverse osmosis. The present system 100 can achieve a gained output ratio of about 4.7, a coefficient of performance of about 1.2, and an energy utilization factor of about 5.9. The cost of freshwater and cooling effect of the integrated system is 2.5$/m$^3$ and 0.0037$/kWh, respectively, while the freshwater cost of standalone humidification-dehumidification system is 6.1$/m$^3$ and the cooling effect cost of standalone refrigeration system is 0.014$/kWh. Interestingly, the present system 100 reduces the cost of freshwater and cooling effect by about 2.4 and 3.8 times than standalone humidification-dehumidification and absorption refrigeration systems, respectively. Thus, it is a promising candidate for both cooling and water productions.

Figure 8:
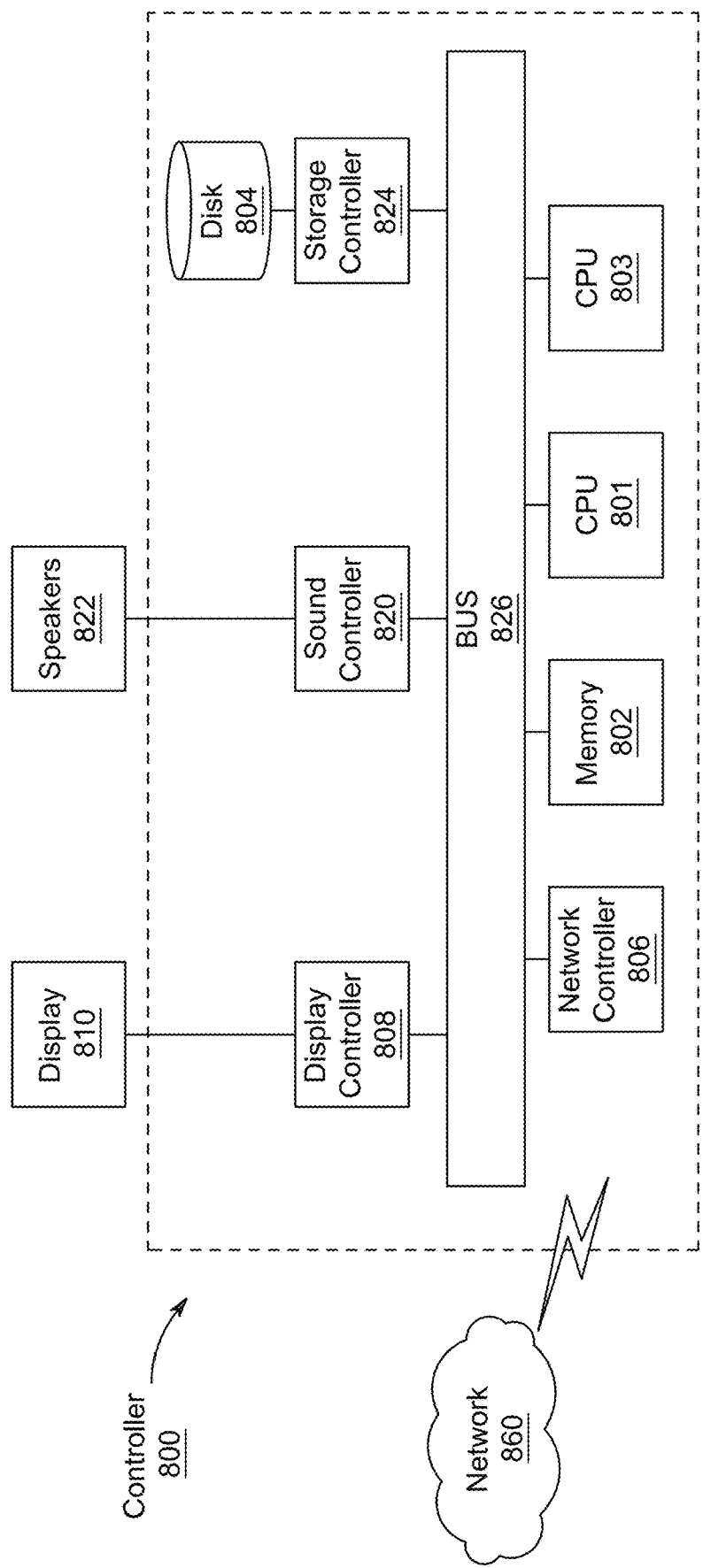
FIG. 8 is an illustration of computing hardware used in the computing system, according to certain embodiments.

Next, further details of hardware description of a controller 800 which may be implemented to control various functions and operation of the present system 100 according to exemplary embodiments is described with reference to FIG. 8. In FIG. 8, the controller 800 is described which is representative of a computing environment in which the controller 800 (also sometimes referred to as computing device) includes a CPU 801 which performs the processes described above/below. The process data and instructions may be stored in memory 802. These processes and instructions may also be stored on a storage medium disk 804 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 801, 803 and an operating system such as Microsoft Windows 7, Microsoft Windows 10, UNIX, Solaris, LINUX, Apple MAC-OS and other systems known to those skilled in the art.

The hardware elements in order to achieve the computing device may be realized by various circuitry elements, known to those skilled in the art. For example, CPU 801 or CPU 803 may be a Xenon or Core processor from Intel of America or an Opteron processor from AMD of America, or may be other processor types that would be recognized by one of ordinary skill in the art. Alternatively, the CPU 801, 803 may be implemented on an FPGA, ASIC, PLD or using discrete logic circuits, as one of ordinary skill in the art would recognize. Further, CPU 801, 803 may be implemented as multiple processors cooperatively working in parallel to perform the instructions of the inventive processes described above.

The controller 800 also includes a network controller 806, such as an Intel Ethernet PRO network interface card from Intel Corporation of America, for interfacing with network 860. As can be appreciated, the network 860 can be a public network, such as the Internet, or a private network such as an LAN or WAN network, or any combination thereof and can also include PSTN or ISDN sub-networks. The network 860 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 808, such as a NVIDIA GeForce GTX or Quadro graphics adaptor from NVIDIA Corporation of America for interfacing with display 810, such as a Hewlett Packard HPL2445w LCD monitor.

A sound controller 820 is also provided in the computing device such as Sound Blaster X-Fi Titanium from Creative, to interface with speakers/microphone 822 thereby providing sounds and/or music.

The general purpose storage controller 824 connects the storage medium disk 804 with communication bus 826, which may be an ISA, EISA, VESA, PCI, or similar, for interconnecting all of the components of the computing device. A description of the general features and functionality of the display 810, the display controller 808, storage controller 824, network controller 806, and the sound controller 820 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A cooling and desalination system, comprising:
   a humidification-dehumidification (HDH) system comprising a humidifier for humidifying a carrier gas using saline water, and a dehumidifier for dehumidifying the carrier gas to obtain desalinated water; and
   a vapor-absorption refrigeration (VAR) system comprising an evaporator for evaporating a refrigerant and providing cooling effect, an absorber for absorbing the refrigerant by an absorbent, a first desorber for heating the refrigerant and the absorbent to obtain vapors of the refrigerant, and a condenser for condensing the vapors of the refrigerant,
   wherein the HDH system and the VAR system are connected at the absorber and the condenser and are configured so that the carrier gas, after passing through the humidifier, absorbs heat from the absorber and the condenser, before entering the dehumidifier.

2. The cooling and desalination system of claim 1, wherein:
   a first outlet of the humidifier is connected to an inlet of the absorber,
   a second outlet of the humidifier is connected to an inlet of the condenser,
   an outlet of the absorber is connected to a first inlet of the dehumidifier, and
   an outlet of the condenser is connected to a second inlet of the dehumidifier.

3. The cooling and desalination system of claim 2, further comprising:
   a controller configured to adjust volumes of a first portion of the carrier gas exiting from the first outlet of the humidifier and a second portion of the carrier gas exiting from the second outlet of the humidifier.

4. The cooling and desalination system of claim 3, wherein:
   the absorber comprises a first heat exchanger for the first portion of the carrier gas to absorb latent heat of the absorbing the refrigerant by the absorbent, and
   the condenser comprises a second heat exchanger for the second portion of the carrier gas to absorb latent heat of the condensing the vapors of the refrigerant.

5. The cooling and desalination system of claim 1, further comprising:
a first unmixed heat exchanger for a weak solution exiting from the first desorber to exchange heat with a strong solution exiting from the absorber.

6. The cooling and desalination system of claim 5, wherein:
the cooling and desalination system includes at least the first desorber and a second desorber and a controller,
the first desorber is configured to receive heat for heating the refrigerant and the absorbent to obtain the vapors of the refrigerant, and
the controller is configured to adjust volumes of a first portion of the strong solution entering the first desorber.

7. The cooling and desalination system of claim 6, wherein:
the cooling and desalination system includes at least the first unmixed heat exchanger and a second unmixed heat exchanger,
the first unmixed heat exchanger is configured for the first portion of the strong solution to exchange heat with the weak solution exiting from the first desorber, and
the second unmixed heat exchanger is configured for the strong solution exiting from the absorber to exchange heat with a mixed solution exiting from the second desorber.

8. The cooling and desalination system of claim 7, wherein:
the second desorber is configured for mixing a second portion of the strong solution and the weak solution exiting from the first unmixed heat exchanger to obtain the mixed solution, and
the second desorber comprises a heat exchanger configured for the vapors of the refrigerant exiting from the first desorber to exchange heat with the mixed solution.

9. The cooling and desalination system of claim 1, further comprising:
a throttling valve configured to expand the refrigerant exiting from the condenser.

10. The cooling and desalination system of claim 1, wherein the carrier gas comprises air.

11. A method for concurrent cooling and desalination, the method comprising:
evaporating a refrigerant in an evaporator of a vapor-absorption refrigeration (VAR) system;
absorbing the refrigerant by an absorbent in an absorber of the VAR system;
heating the refrigerant and the absorbent to obtain first vapors of the refrigerant in a first desorber of the VAR system;
condensing the first vapors of the refrigerant in a condenser of the VAR system;
humidifying a carrier gas in a humidifier of a humidification-dehumidification (HDH) system using saline water; and
dehumidifying the carrier gas to obtain desalinated water in a dehumidifier of the HDH system,
wherein the VAR system and the HDH system are configured so that the carrier gas, after the humidifying, absorbs heat from the absorber and the condenser, before the dehumidifying.

12. The method of claim 11, further comprising:
splitting the carrier gas, after the humidifying, into a first portion and a second portion:
passing the first portion of the carrier gas through the absorber; and
passing the second portion of the carrier gas through the condenser.

13. The method of claim 12, wherein:
the first portion of the carrier gas is configured to absorb latent heat of the absorbing the refrigerant by the absorbent, and
the second portion of the carrier gas is configured to absorb latent heat of the condensing first vapors of the refrigerant.

14. The method of claim 12, wherein:
the first portion of the carrier gas is about 50-70 vol. % of the carrier gas.

15. The method of claim 12, further comprising:
combining the first portion of the carrier gas and the second portion of the carrier gas before the dehumidifying.

16. The method of claim 11, further comprising:
splitting a strong solution into a first portion and a second portion, the strong solution comprising the refrigerant and the absorbent exiting from the absorber;
passing the first portion of the strong solution through a first unmixed heat exchanger;
heating the first portion of the strong solution in the first desorber to obtain the first vapors of the refrigerant and a weak solution; and
passing the weak solution through the first unmixed heat exchanger.

17. The method of claim 16, further comprising:
mixing the weak solution and the second portion of the strong solution to obtain a mixed solution in a second desorber;
passing the first vapors of the refrigerant through the second desorber for heat exchange between the mixed solution and the first vapors of the refrigerant to obtain second vapors of the refrigerant from the mixed solution; and
condensing the first vapors of the refrigerant and the second vapors of the refrigerant in the condenser.

18. The method of claim 17, further comprising:
passing the strong solution through a second unmixed heat exchanger before the splitting the strong solution;
passing the mixed solution through the second unmixed heat exchanger; and
passing the mixed solution through the absorber such that the refrigerant, which exits from the evaporator, is absorbed by the weak solution.

19. The method of claim 11, wherein the carrier gas comprises air.

20. The method of claim 11, wherein:
the refrigerant comprises water, and
the absorbent comprises lithium bromide.

* * * * *